US012615648B2

(12) United States Patent
Abedini et al.

(10) Patent No.: US 12,615,648 B2
(45) Date of Patent: Apr. 28, 2026

(54) TECHNIQUES FOR LINK ADAPTATION FOR BROADCAST CHANNELS

(71) Applicant: QUALCOMM Incorporated, San Diego, CA (US)

(72) Inventors: Navid Abedini, Basking Ridge, NJ (US); Kapil Gulati, Belle Mead, NJ (US); Iyab Issam Sakhnini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 17/876,940

(22) Filed: Jul. 29, 2022

(65) Prior Publication Data

US 2024/0040592 A1 Feb. 1, 2024

(51) Int. Cl.
*H04W 72/00* (2023.01)
*H04W 72/30* (2023.01)

(52) U.S. Cl.
CPC ................................. *H04W 72/30* (2023.01)

(58) Field of Classification Search
CPC ... H04L 1/0003; H04L 1/0009; H04L 1/0026; H04W 74/002; H04W 72/30
See application file for complete search history.

(56) References Cited

U.S. PATENT DOCUMENTS 8,412,222 B2 4/2013 Agrawal et al.
10,523,300 B2 * 12/2019 Malik ................. H04B 7/0689

| | | | |
|---|---|---|---|
| 10,623,946 B1 * | 4/2020 | Kumar | .................. H04W 76/16 |
| 2005/0138671 A1 | 6/2005 | Love et al. | |
| 2016/0227575 A1 * | 8/2016 | Furuskog | .......... H04W 72/1268 |
| 2018/0324865 A1 * | 11/2018 | Hui | .................... H04W 74/0891 |
| 2019/0089443 A1 * | 3/2019 | Malik | .................. H04B 7/0617 |
| 2020/0137624 A1 * | 4/2020 | Dhanda | ................. H04W 24/10 |
| 2021/0099991 A1 * | 4/2021 | Liu | ........................ H04L 5/0048 |
| 2022/0078855 A1 | 3/2022 | Kwak et al. | |
| 2022/0311586 A1 * | 9/2022 | Vadapalli | .......... H04W 72/0446 |

OTHER PUBLICATIONS

International Search Report and Written Opinion—PCT/US2023/069718—ISA/EPO—Oct. 20, 2023.

* cited by examiner

*Primary Examiner* — Liton Miah

(74) *Attorney, Agent, or Firm* — Holland & Hart LLP/Qualcomm Incorporated

(57) ABSTRACT

Methods, systems, and devices for wireless communications are described that provide for an indication of a channel state by a user equipment (UE) that can be used to select transmission parameters for a downlink broadcast transmission. A network entity may transmit a first downlink transmission that may be received at a UE and used to measure a channel quality at the UE. The UE may transmit an uplink communication that provides an indication of the channel quality. The network device may receive the uplink communication, determine one or more transmission parameters for a broadcast downlink transmission based on the indication of the channel quality, and transmit the broadcast downlink transmission.

30 Claims, 21 Drawing Sheets

Network Entity
105-a

210

220

225    215    205

115-a

| | First DL Tx |
| | UL Tx w/ Channel Quality Indication |
| | Broadcast Tx |

200

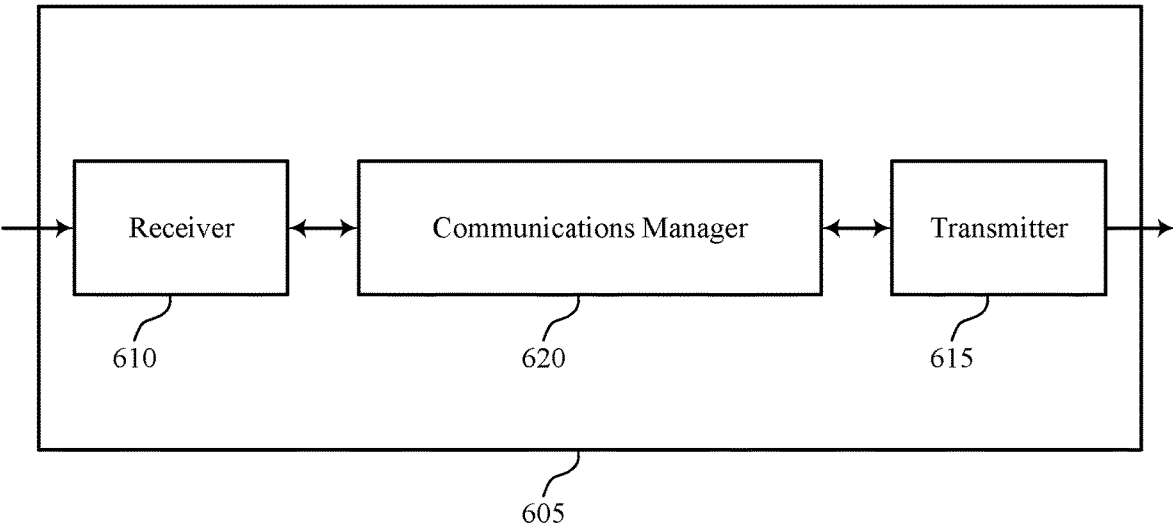
610
620
615
605
600
FIG. 6

Receiver

Communications Manager

Transmitter

1010

1020

1015

1005

1000

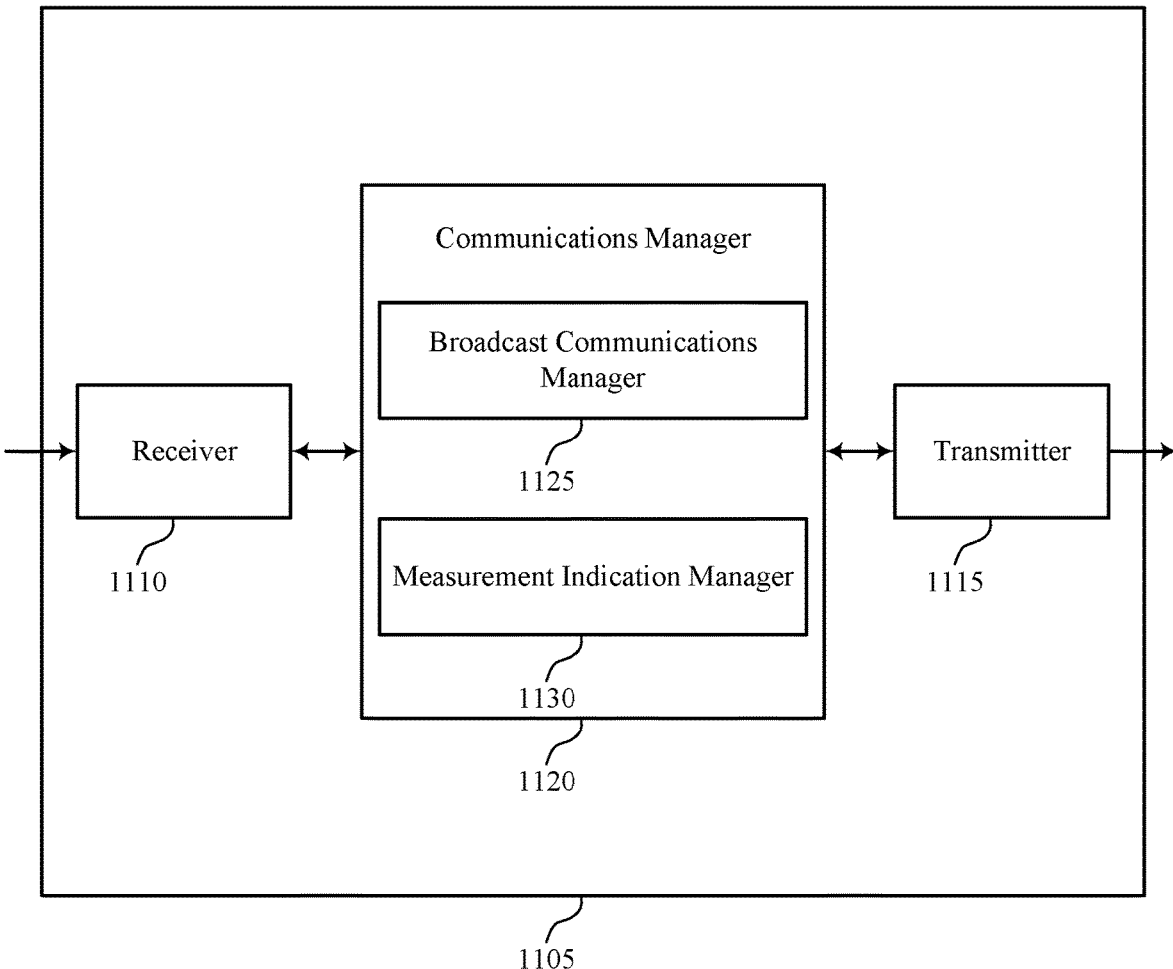
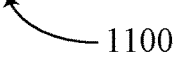
FIG. 11

130                105                                    115

Network
Entity

Transceiver                          Antenna 1310                                 1315

Communications
Manager

Memory

Code

1330

1320                                 1325

Processor

1340

1335

1305

1300

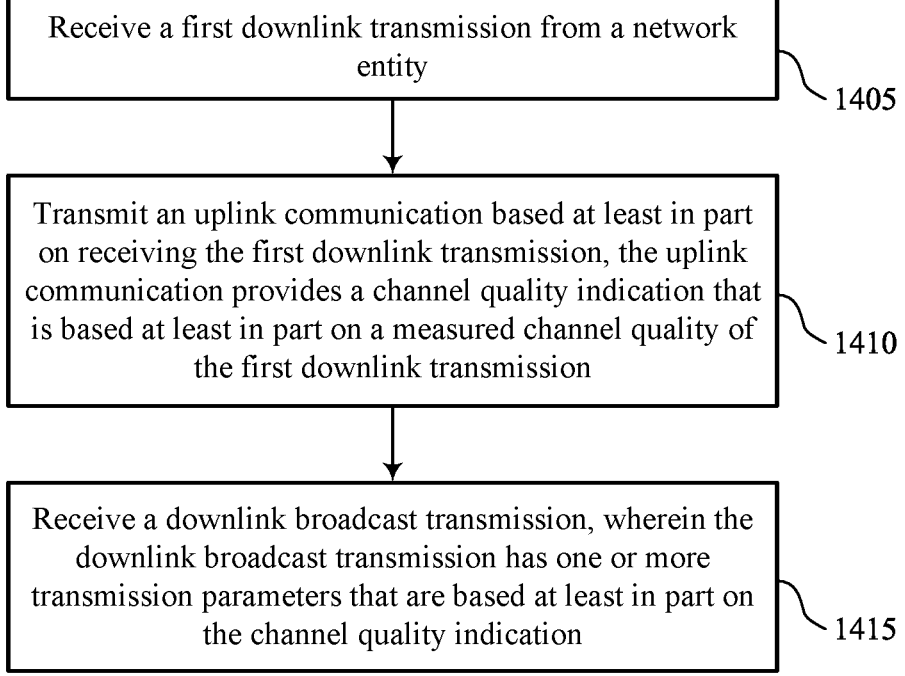

Receive a first downlink transmission from a network entity ⟍ 1405

Transmit an uplink communication based at least in part on receiving the first downlink transmission, the uplink communication provides a channel quality indication that is based at least in part on a measured channel quality of the first downlink transmission ⟍ 1410

Receive a downlink broadcast transmission, wherein the downlink broadcast transmission has one or more transmission parameters that are based at least in part on the channel quality indication ⟍ 1415

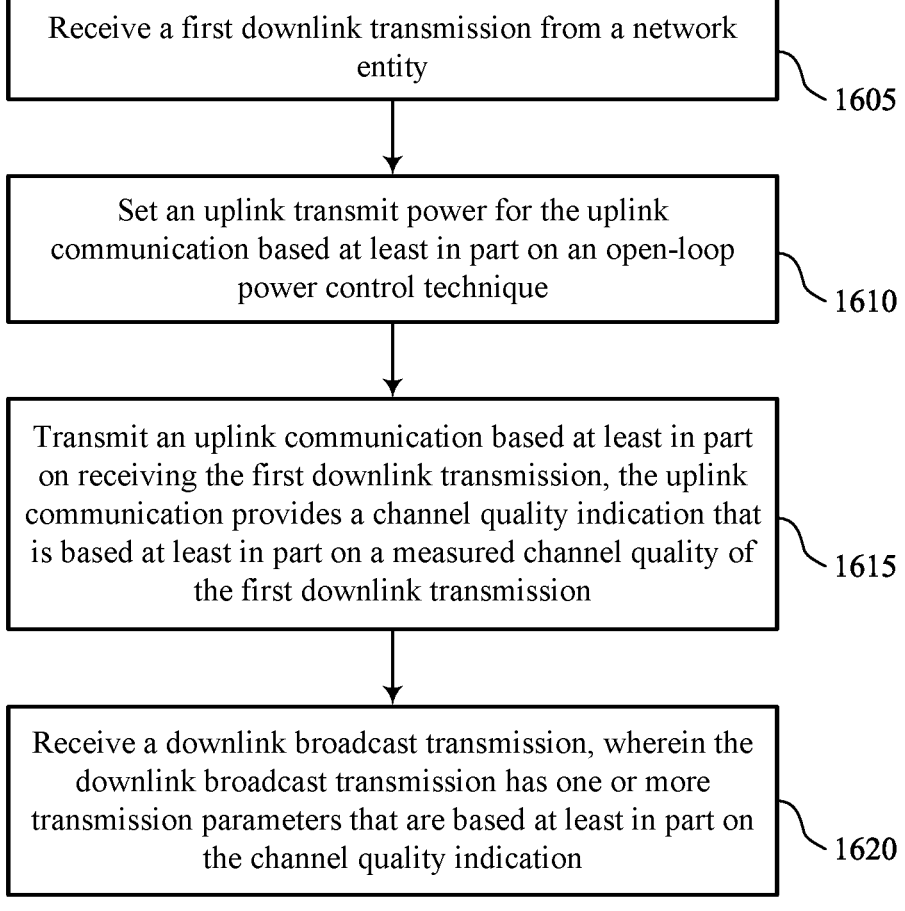

Receive a first downlink transmission from a network entity

1605

Set an uplink transmit power for the uplink communication based at least in part on an open-loop power control technique

1610

Transmit an uplink communication based at least in part on receiving the first downlink transmission, the uplink communication provides a channel quality indication that is based at least in part on a measured channel quality of the first downlink transmission

1615

Receive a downlink broadcast transmission, wherein the downlink broadcast transmission has one or more transmission parameters that are based at least in part on the channel quality indication

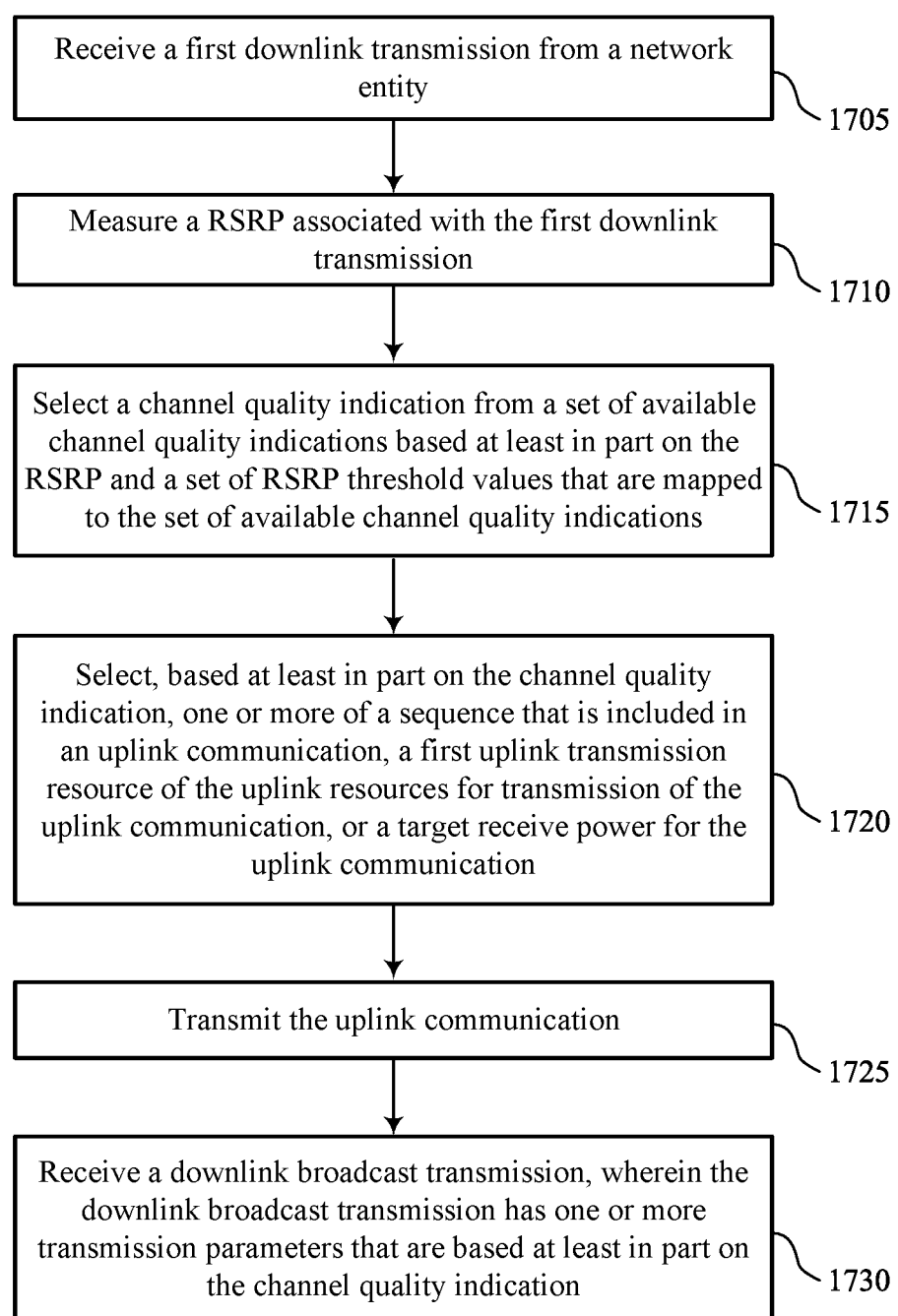

Receive a first downlink transmission from a network entity — 1705

Measure a RSRP associated with the first downlink transmission — 1710

Select a channel quality indication from a set of available channel quality indications based at least in part on the RSRP and a set of RSRP threshold values that are mapped to the set of available channel quality indications — 1715

Select, based at least in part on the channel quality indication, one or more of a sequence that is included in an uplink communication, a first uplink transmission resource of the uplink resources for transmission of the uplink communication, or a target receive power for the uplink communication — 1720

Transmit the uplink communication — 1725

Receive a downlink broadcast transmission, wherein the downlink broadcast transmission has one or more transmission parameters that are based at least in part on the channel quality indication — 1730

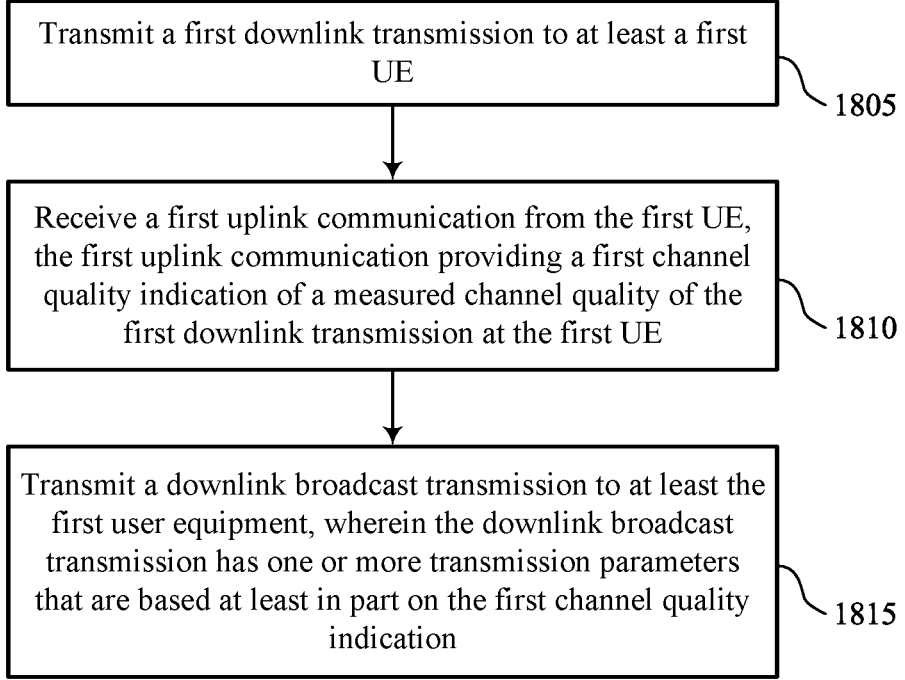

Transmit a first downlink transmission to at least a first UE

1805

Receive a first uplink communication from the first UE, the first uplink communication providing a first channel quality indication of a measured channel quality of the first downlink transmission at the first UE

1810

Transmit a downlink broadcast transmission to at least the first user equipment, wherein the downlink broadcast transmission has one or more transmission parameters that are based at least in part on the first channel quality indication

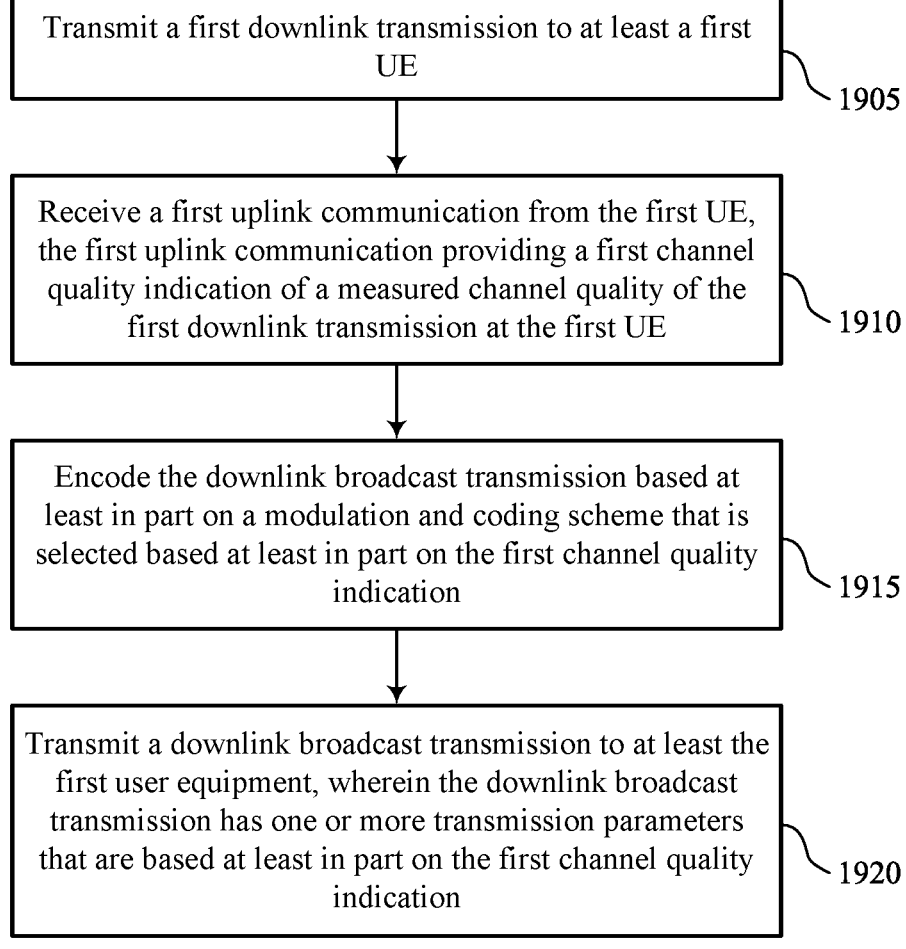

Transmit a first downlink transmission to at least a first UE
⟍1905

Receive a first uplink communication from the first UE, the first uplink communication providing a first channel quality indication of a measured channel quality of the first downlink transmission at the first UE
⟍1910

Encode the downlink broadcast transmission based at least in part on a modulation and coding scheme that is selected based at least in part on the first channel quality indication
⟍1915

Transmit a downlink broadcast transmission to at least the first user equipment, wherein the downlink broadcast transmission has one or more transmission parameters that are based at least in part on the first channel quality indication
⟍1920

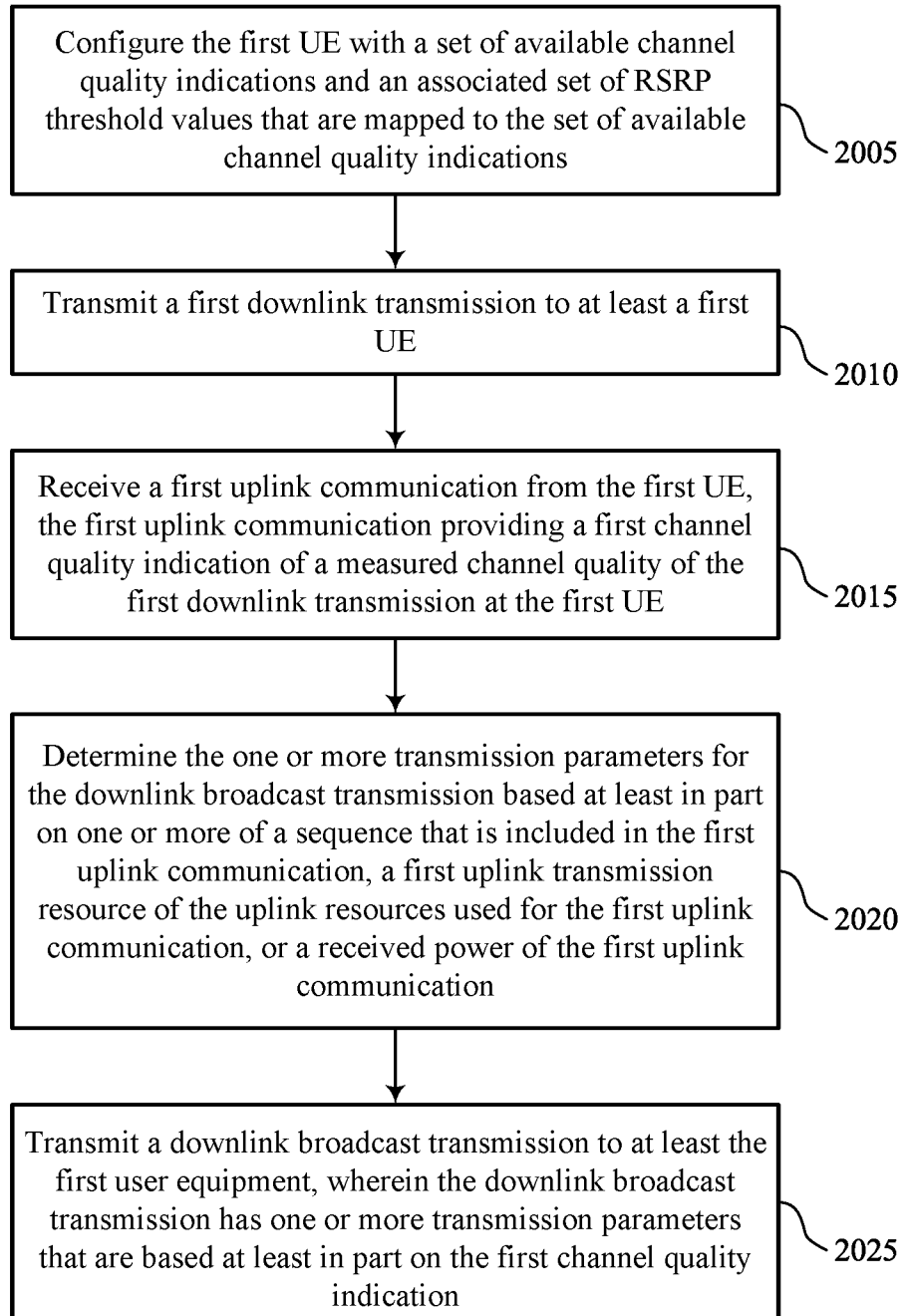

Configure the first UE with a set of available channel quality indications and an associated set of RSRP threshold values that are mapped to the set of available channel quality indications

2005

Transmit a first downlink transmission to at least a first UE

2010

Receive a first uplink communication from the first UE, the first uplink communication providing a first channel quality indication of a measured channel quality of the first downlink transmission at the first UE

2015

Determine the one or more transmission parameters for the downlink broadcast transmission based at least in part on one or more of a sequence that is included in the first uplink communication, a first uplink transmission resource of the uplink resources used for the first uplink communication, or a received power of the first uplink communication

2020

Transmit a downlink broadcast transmission to at least the first user equipment, wherein the downlink broadcast transmission has one or more transmission parameters that are based at least in part on the first channel quality indication

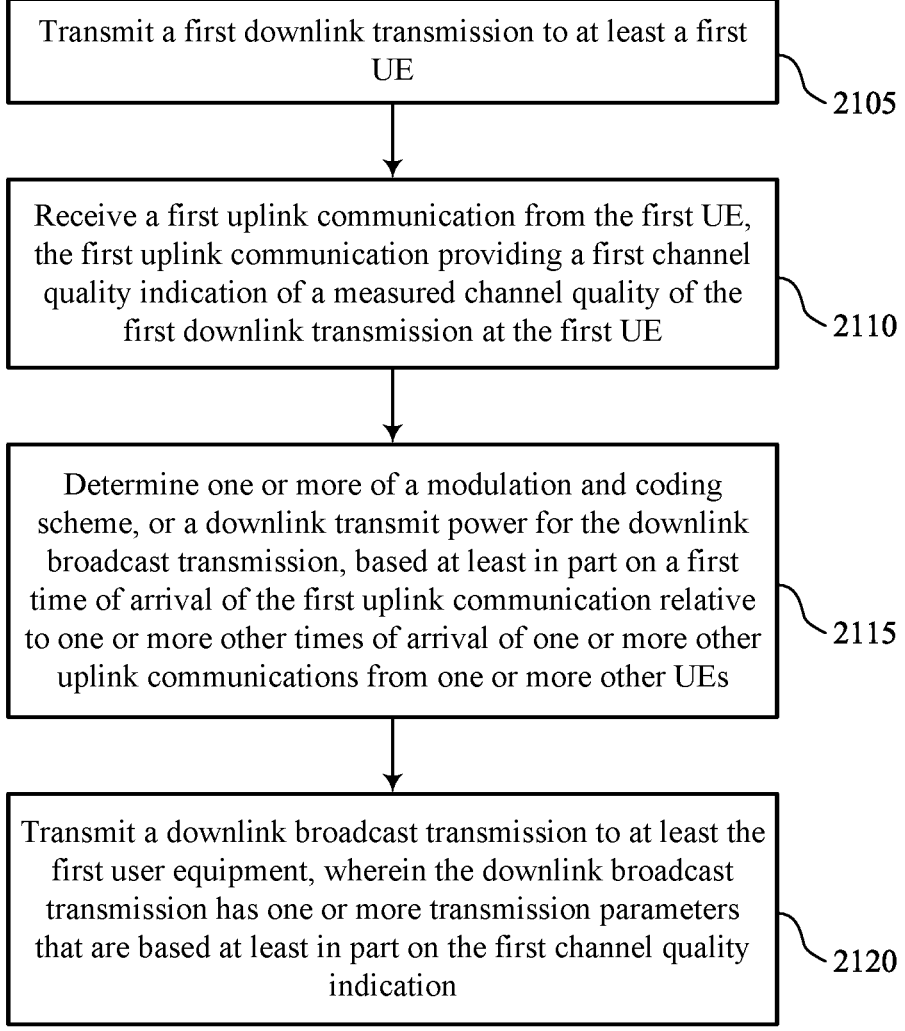

Transmit a first downlink transmission to at least a first UE

2105

Receive a first uplink communication from the first UE, the first uplink communication providing a first channel quality indication of a measured channel quality of the first downlink transmission at the first UE

2110

Determine one or more of a modulation and coding scheme, or a downlink transmit power for the downlink broadcast transmission, based at least in part on a first time of arrival of the first uplink communication relative to one or more other times of arrival of one or more other uplink communications from one or more other UEs

2115

Transmit a downlink broadcast transmission to at least the first user equipment, wherein the downlink broadcast transmission has one or more transmission parameters that are based at least in part on the first channel quality indication

TECHNIQUES FOR LINK ADAPTATION FOR BROADCAST CHANNELS

FIELD OF TECHNOLOGY

The following relates to wireless communications, including techniques for link adaptation for broadcast channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may monitor for one or more broadcast transmissions that provide information for communications with one or more network entities. For example, a UE may monitor for a synchronization system block (SSB) transmission that provides information for use in establishing a connection between the UE and one or more network entities.

SUMMARY

The described techniques relate to improved methods, systems, devices, and apparatuses that support techniques for link adaptation for broadcast channels. For example, the described techniques provide for an indication of a channel state that can be used to select transmission parameters (e.g., a modulation and coding scheme (MCS), downlink transmission power, or both) for a downlink broadcast transmission. Such selection of transmission parameters may allow for efficient selection of transmission power and wireless resources for the downlink broadcast transmission, thereby enhancing efficiency for communications. In some cases, a network entity may transmit a first downlink transmission (e.g., a keep-alive signal, paging early indication, synchronization signal block, control information, or other transmission) that may be received at a user equipment (UE), and used to provide an indication of a channel quality between the network entity and the UE. The UE, based on the first downlink transmission, may transmit an uplink communication (e.g., an uplink trigger that prompts a downlink broadcast transmission from the network entity) that provides an indication of the channel quality. The network device may receive the uplink communication, determine one or more transmission parameters for a broadcast downlink transmission based on the indication of the channel quality, and transmit the downlink broadcast transmission. In some cases, the downlink broadcast transmission may have a transmit power, a modulation and coding scheme, or both, that are selected based on the indication of the channel quality.

A method for wireless communication at a user equipment (UE) is described. The method may include receiving a first downlink transmission from a network entity, transmitting an uplink communication based on receiving the first downlink transmission, the uplink communication provides a channel quality indication that is based on a measured channel quality of the first downlink transmission, and receiving a downlink broadcast transmission, where the downlink broadcast transmission has one or more transmission parameters that are based on the channel quality indication.

An apparatus for wireless communication at a UE is described. The apparatus may include a processor, memory coupled with the processor, and instructions stored in the memory. The instructions may be executable by the processor to cause the apparatus to receive a first downlink transmission from a network entity, transmit an uplink communication based on receiving the first downlink transmission, the uplink communication provides a channel quality indication that is based on a measured channel quality of the first downlink transmission, and receive a downlink broadcast transmission, where the downlink broadcast transmission has one or more transmission parameters that are based on the channel quality indication.

Another apparatus for wireless communication at a UE is described. The apparatus may include means for receiving a first downlink transmission from a network entity, means for transmitting an uplink communication based on receiving the first downlink transmission, the uplink communication provides a channel quality indication that is based on a measured channel quality of the first downlink transmission, and means for receiving a downlink broadcast transmission, where the downlink broadcast transmission has one or more transmission parameters that are based on the channel quality indication.

A non-transitory computer-readable medium storing code for wireless communication at a UE is described. The code may include instructions executable by a processor to receive a first downlink transmission from a network entity, transmit an uplink communication based on receiving the first downlink transmission, the uplink communication provides a channel quality indication that is based on a measured channel quality of the first downlink transmission, and receive a downlink broadcast transmission, where the downlink broadcast transmission has one or more transmission parameters that are based on the channel quality indication.

In some examples of the method, apparatuses, and non-transitory computer-readable medium described herein, the receiving the downlink broadcast transmission may include operations, features, means, or instructions for decoding the downlink broadcast transmission based on a modulation and coding scheme that is selected based on the channel quality indication. In some examples of the method, apparatuses, and non-transitory computer-readable medium described herein, the downlink broadcast transmission includes a remaining minimum system information (RMSI) shared channel transmission, a paging shared channel transmission, or a random access channel (RACH) response. In some examples of the method, apparatuses, and non-transitory computer-readable medium described herein, the uplink communication includes a trigger for an on-demand synchronization signal block (SSB) transmission or an on-demand RMSI transmission, or the uplink communication includes a paging early indication (PEI) response.

In some examples of the method, apparatuses, and non-transitory computer-readable medium described herein, the transmitting the uplink communication may include operations, features, means, or instructions for setting an uplink transmit power for the uplink communication based on an open-loop power control technique and transmitting the uplink communication using a transmission timing without an associated timing advance. Some examples of the method, apparatuses, and non-transitory computer-readable medium described herein may further include operations, features, means, or instructions for measuring a RSRP associated with the first downlink transmission, and where the channel quality indication is based on the RSRP. Some examples of the method, apparatuses, and non-transitory computer-readable medium described herein may further include operations, features, means, or instructions for selecting the channel quality indication from a set of available channel quality indications based on the RSRP and a set of RSRP threshold values that are mapped to the set of available channel quality indications.

Some examples of the method, apparatuses, and non-transitory computer-readable medium described herein may further include operations, features, means, or instructions for selecting, based on the channel quality indication, one or more of a sequence that is included in the uplink communication, a first uplink transmission resource of the uplink resources for transmission of the uplink communication, or a target receive power for the uplink communication. In some examples of the method, apparatuses, and non-transitory computer-readable medium described herein, one or more measured channel quality thresholds and associated mappings to the channel quality indication are provided to the UE in a prespecified configuration, a SI communication, a SSB communication, a MIB communication, a control channel communication associated with the first downlink transmission, a communication from a serving cell for one or more neighboring cells, or any combinations thereof.

In some examples of the method, apparatuses, and non-transitory computer-readable medium described herein, the channel quality indication is provided in a payload of the uplink communication. In some examples of the method, apparatuses, and non-transitory computer-readable medium described herein, the payload of the uplink communication includes one or more bits of a payload field, and different bit values associated with the payload field are mapped to different channel quality thresholds. In some examples of the method, apparatuses, and non-transitory computer-readable medium described herein, the channel quality indication provides an interference indication that are based on a detected level of interference associated with the first downlink transmission and the uplink communication indicates a transmission beam associated with the UE for the downlink broadcast transmission.

Some examples of the method, apparatuses, and non-transitory computer-readable medium described herein may further include operations, features, means, or instructions for selecting a RACH configuration based on the channel quality indication, the RACH configuration including one or more of a message-1 (MSG1) or message-3 (MSG3) format, a RACH preamble format, a number of repetitions for RACH messages, a MCS for RACH messages, or any combinations thereof.

A method for wireless communication at a network entity is described. The method may include transmitting a first downlink transmission to at least a first UE, receiving a first uplink communication from the first UE, the first uplink communication providing a first channel quality indication of a measured channel quality of the first downlink transmission at the first UE, and transmitting a downlink broadcast transmission to at least the first user equipment, where the downlink broadcast transmission has one or more transmission parameters that are based on the first channel quality indication.

An apparatus for wireless communication at a network entity is described. The apparatus may include a processor, memory coupled with the processor, and instructions stored in the memory. The instructions may be executable by the processor to cause the apparatus to transmit a first downlink transmission to at least a first UE, receive a first uplink communication from the first UE, the first uplink communication providing a first channel quality indication of a measured channel quality of the first downlink transmission at the first UE, and transmit a downlink broadcast transmission to at least the first user equipment, where the downlink broadcast transmission has one or more transmission parameters that are based on the first channel quality indication.

Another apparatus for wireless communication at a network entity is described. The apparatus may include means for transmitting a first downlink transmission to at least a first UE, means for receiving a first uplink communication from the first UE, the first uplink communication providing a first channel quality indication of a measured channel quality of the first downlink transmission at the first UE, and means for transmitting a downlink broadcast transmission to at least the first user equipment, where the downlink broadcast transmission has one or more transmission parameters that are based on the first channel quality indication.

A non-transitory computer-readable medium storing code for wireless communication at a network entity is described. The code may include instructions executable by a processor to transmit a first downlink transmission to at least a first UE, receive a first uplink communication from the first UE, the first uplink communication providing a first channel quality indication of a measured channel quality of the first downlink transmission at the first UE, and transmit a downlink broadcast transmission to at least the first user equipment, where the downlink broadcast transmission has one or more transmission parameters that are based on the first channel quality indication.

In some examples of the method, apparatuses, and non-transitory computer-readable medium described herein, the transmitting the downlink broadcast transmission may include operations, features, means, or instructions for encoding the downlink broadcast transmission based on a modulation and coding scheme that is selected based on the first channel quality indication. In some examples of the method, apparatuses, and non-transitory computer-readable medium described herein, the downlink broadcast transmission includes a RMSI shared channel transmission, a paging shared channel transmission, or a RACH response. In some examples of the method, apparatuses, and non-transitory computer-readable medium described herein, the first uplink communication includes a trigger for an on-demand SSB transmission or an on-demand RMSI transmission, or the first uplink communication includes a PEI response.

In some examples of the method, apparatuses, and non-transitory computer-readable medium described herein, an uplink transmit power for the first uplink communication is based on an open-loop power control technique, and the first uplink communication is transmitted using a transmission timing without an associated timing advance. In some examples of the method, apparatuses, and non-transitory computer-readable medium described herein, the first channel quality indication provides a RSRP associated with the first downlink transmission. Some examples of the method, apparatuses, and non-transitory computer-readable medium described herein may further include operations, features, means, or instructions for configuring the first UE with a set of available channel quality indications and an associated set of RSRP threshold values that are mapped to the set of available channel quality indications.

Some examples of the method, apparatuses, and non-transitory computer-readable medium described herein may further include operations, features, means, or instructions for determining the one or more transmission parameters for the downlink broadcast transmission based on one or more of a sequence that is included in the first uplink communication, a first uplink transmission resource of the uplink resources used for the first uplink communication, or a received power of the first uplink communication. Some examples of the method, apparatuses, and non-transitory computer-readable medium described herein may further include operations, features, means, or instructions for determining one or more of a modulation and coding scheme, or a downlink transmit power for the downlink broadcast transmission, based on a first time of arrival of the first uplink communication relative to one or more other times of arrival of one or more other uplink communications from one or more other UEs. In some examples of the method, apparatuses, and non-transitory computer-readable medium described herein, one or more measured channel quality thresholds and associated mappings to the first channel quality indication is provided to the UE in a prespecified configuration, a SI communication, a SSB communication, a MIB) communication, a control channel communication associated with the first downlink transmission, a communication from a serving cell for one or more neighboring cells, or any combinations thereof.

In some examples of the method, apparatuses, and non-transitory computer-readable medium described herein, the first channel quality indication is provided in a payload of the first uplink communication. In some examples of the method, apparatuses, and non-transitory computer-readable medium described herein, the payload of the first uplink communication includes one or more bits of a payload field, and different bit values associated with the payload field is mapped to different channel quality thresholds. In some examples of the method, apparatuses, and non-transitory computer-readable medium described herein, the first channel quality indication also provides an interference indication that is based on a detected level of interference associated with the first downlink transmission.

BRIEF DESCRIPTION OF THE DRAWINGS

FIGS. 6 and 7 show block diagrams of devices that support techniques for link adaptation for broadcast channels in accordance with one or more aspects of the present disclosure.

FIGS. 10 and 11 show block diagrams of devices that support techniques for link adaptation for broadcast channels in accordance with one or more aspects of the present disclosure.

FIGS. 14 through 21 show flowcharts illustrating methods that support techniques for link adaptation for broadcast channels in accordance with one or more aspects of the present disclosure.

DETAILED DESCRIPTION

Figure 1:
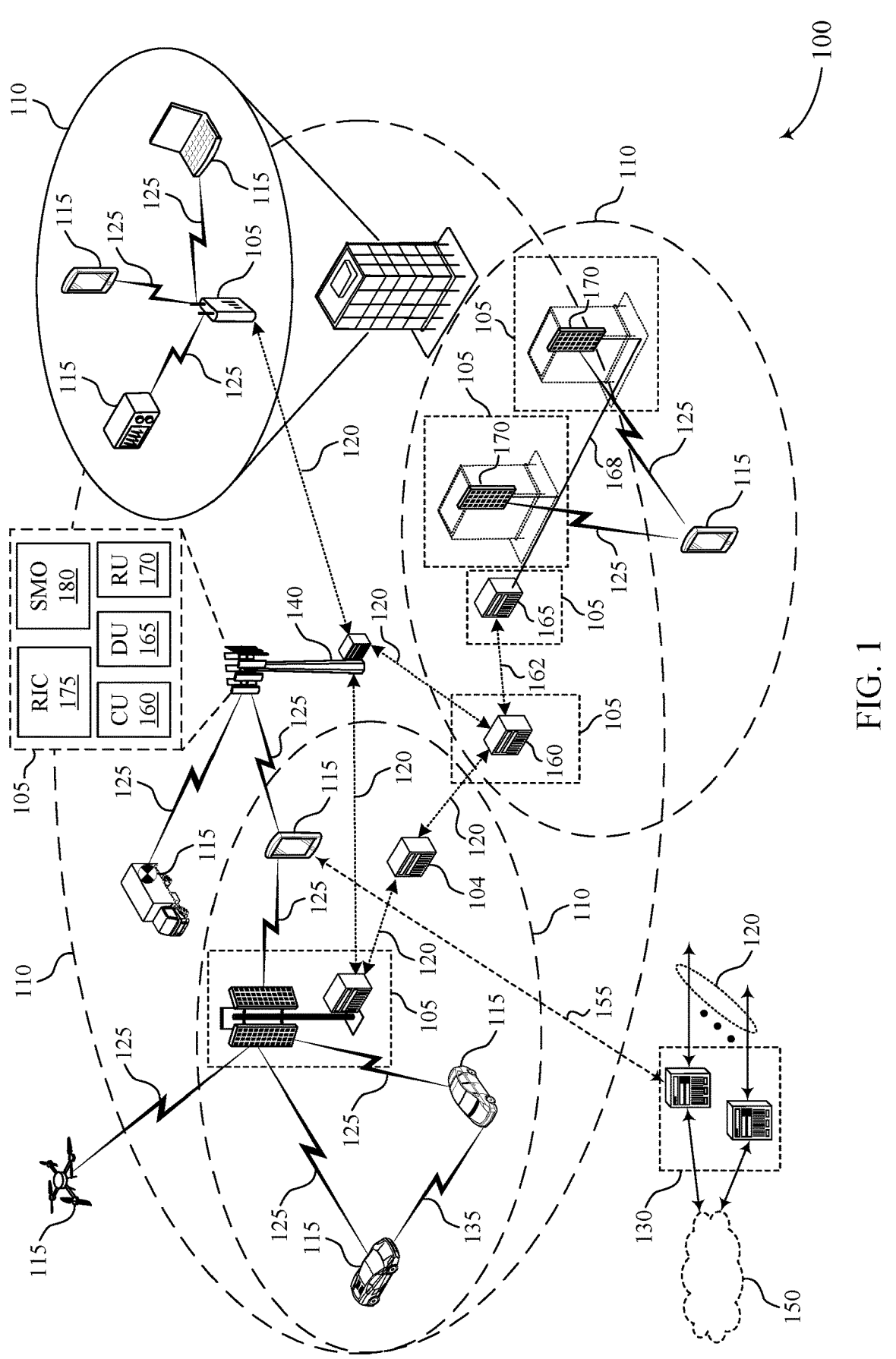
FIG. 1 illustrates an example of a wireless communications system that supports techniques for link adaptation for broadcast channels in accordance with one or more aspects of the present disclosure.

Some wireless communications systems, such as fifth generation (5G) systems, can use a relatively large amount of power in some situations. For example, systems that use beamformed communications may transmit multiple directional beams in multiple directions from a network entity, such as a radio unit (RU) or a radio head. Such systems may provide information for use by a user equipment (UE) to access the wireless communications system (e.g., system information that provides parameters for system access) using beam sweeping techniques in which information is provided in multiple different transmissions in multiple different directions. Such beam sweeping techniques may consume additional power relative to techniques that do not use beam sweeping (e.g., information provided in a single omni-directional transmission may consume less power than transmission of multiple instances of the information in multiple different directions). In some cases, to help reduce power consumption, some information may be transmitted in using on-demand techniques, where the information is provided in response to a request or a trigger for such a transmission.

Further, such transmissions, whether transmitted according to a periodic schedule or transmitted on-demand, may be transmitted using a transmit power and modulation and coding scheme (MCS) that is adapted to provide reliable decoding for all receiving devices (e.g., receiving UEs), including devices located at an edge of a coverage area of a transmitting device. This may result in relatively high power consumption due to higher transmit power, relatively low coding rates in the associated MCS, or both. As discussed, in some cases on-demand techniques may be used, such as through one or more of on-demand synchronization signal block (SSB) transmission, on-demand remaining minimum system information (RMSI) transmission, or paging early indicator (PEI) techniques, where SSB/RMSI/paging transmissions are provided only on beams where a UE is present. However, such techniques continue to transmit such broadcast transmissions at relatively high transmit power and with relatively low coding rates.

In accordance with various aspects discussed herein, techniques are provided that allow for a UE to transmit an initial uplink transmission, such as a trigger for an on-demand SSB or on-demand RMSI, or a PEI response. The initial uplink transmission may also provide an indication of a received power at the UE for a downlink signal of the associated network entity or cell. A network entity that receives the initial uplink transmission may determine an associated channel state for one or more UEs that are to receive an associated broadcast transmission, and adjust one or more of a MCS or transmit power of the broadcast transmission based on the determined channel state. In some cases, the UE may provide the indication of the received power at the UE through a reference signal received power (RSRP) indication that is quantized to a two or more levels (e.g., 2, 3, or 4 RSRP levels). In some cases, the RSRP may be indicated based on resources used to transmit the initial uplink transmission, a transmitted sequence included in the initial uplink transmission, a transmit power of the initial uplink transmission, or any combinations thereof. Additionally, or alternatively, a payload may be transmitted with the initial uplink transmission that provides an indication of the RSRP level. In some cases, a UE may be configured with RSRP levels that are mapped to uplink indications according to prespecified configurations, by system information, by a SSB or master information block (MIB), in a corresponding control channel indication (e.g., in a physical downlink control channel (PDCCH) communication, in system information (e.g., in one or more system information blocks (SIBs)), in radio resource control (RRC) signaling from a serving cell for a neighboring cell, or any combinations thereof. In some cases, the channel quality indication also may be based on an interference measurement.

Such techniques may allow for enhanced system efficiency and reduced power consumption. In some cases, a network entity may determine that a downlink transmission (e.g., a RMSI transmission or paging transmission) may be transmitted at a lower power than would otherwise be used to ensure cell-edge UE reception, and thus network power savings may be achieved while providing reliable communications. Additionally, or alternatively, the downlink transmission may use a MCS with a higher modulation order, higher coding rate, or both, and thus fewer wireless resources may be used for the transmission and system efficiency may be enhanced while providing reliable communications.

Aspects of the disclosure are initially described in the context of wireless communications systems. Aspects of the disclosure are further illustrated by and described with reference to uplink trigger signal transmissions, a process flow, apparatus diagrams, system diagrams, and flowcharts that relate to techniques for link adaptation for broadcast channels.

FIG. 1 illustrates an example of a wireless communications system 100 that supports techniques for link adaptation for broadcast channels in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for link adaptation for broadcast channels as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In accordance with various aspects discussed herein, a UE 115 may provide an indication of a channel state that can be used to select transmission parameters (e.g., a MCS, downlink transmission power, or both) for a downlink broadcast transmission from a network entity 105. In some cases, a network entity 105 may transmit a first downlink transmission (e.g., a keep-alive signal, PEI, SSB, control information, or other transmission) that may be received at a UE 115, and used to determine an estimate of the channel state (e.g., a RSRP value measured from the first downlink transmission). The UE 115, based on the first downlink transmission, may transmit an uplink communication (e.g., an uplink trigger that prompts a downlink broadcast transmission) that provides the indication of the channel state. The network device 105 may receive the uplink communication, determine one or more transmission parameters for a broadcast downlink transmission, and transmit the downlink broadcast transmission. In some cases, the downlink broadcast transmission may have a transmit power, a MCS, or both, that are selected based on the indication of the channel state.

Figure 2:
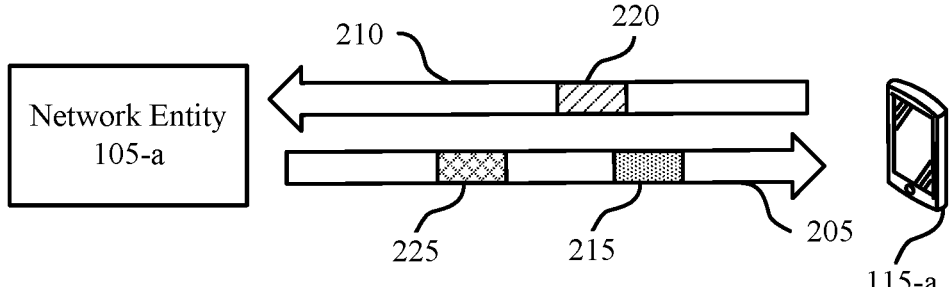
FIG. 2 illustrates an example of a wireless communications system that supports techniques for link adaptation for broadcast channels in accordance with one or more aspects of the present disclosure.

FIG. 2 illustrates an example of a wireless communications system 200 that supports techniques for link adaptation for broadcast channels in accordance with one or more aspects of the present disclosure. As illustrated, wireless communications system 200 may include UE 115-a and network entity 105-a, which may be examples of a UE 115 or a network entity 105, as described above with reference to FIG. 1. Wireless communications system 200 may also include downlink 205 and uplink 210. Network entity 105-a may use downlink 205 to convey control and/or data information to UE 115-a. And UE 115-a may use uplink 210 to convey control and/or data information to the network entity 105-a. In some cases, downlink 205 may use different time and/or frequency resources than uplink 210.

In some cases, the network entity 105-a may transmit one or more broadcast transmissions 225 via downlink 205. Such broadcast transmissions 225 may be used to provide information to multiple UEs 115 that may be in a coverage area of the network entity 105-a. In some cases, a few broadcast channels that may have a relatively large impact on power consumption at the network entity 105-a, as well as an impact on system overhead (e.g., that may reduce capacity for other transmissions). For example, RMSI physical downlink shared channel (PDSCH) transmissions, other system information PDSCH transmissions, and paging PDSCH transmissions may be transmitted using beam sweeping techniques, such that multiple instances of information provided via the transmissions may be transmitted via multiple different beams, and such multiple transmissions consume power. Further, the MCS of these channels may be selected by the network entity 105-a based on a coverage that is to be provided. For example, the network entity 105-a may select an MCS that can provide successful reception at a given target signal to interference and noise ratio (SINR), which may approximate an intended coverage distance. In many cases the selected MCS may have a relatively low modulation order and coding rate in order to provide sufficient reliability for cell-edge UEs 115.

In some cases, the network entity 105-a and UE 115-a may use one or more procedures to reduce power consumption, overhead, or both, associated with broadcast transmissions 225, such as on-demand techniques where the network entity 105-a may transmit a first downlink transmission 215 (e.g., a keep-alive signal, SSB, PEI, or any combinations thereof). The UE 115-a, based on the first downlink transmission 215, may transmit an uplink transmission 220 that triggers a subsequent downlink broadcast transmission 225. In such a manner, an amount of downlink broadcast transmissions 225 that are transmitted may be reduced relative to cases where the network entity 105-a would transmit using beam sweeping across multiple configured beams on each occasion for transmission of the downlink broadcast transmission 225. In accordance with various aspects discussed herein, the uplink transmission 220 that triggers the downlink broadcast transmission 225 may provide an indication of a channel quality or channel state that may be measured at the UE 115-a based on the first downlink transmission 215. In some cases, the network entity 105-a may use the indicated channel quality or channel state to select a transmit power, MCS, or both, for one or more subsequent downlink broadcast transmissions 225, which may provide for power reduction, overhead reduction, or both, by providing transmission parameters for the downlink broadcast transmission 225 that are suitable for the channel conditions of UEs 115 that are to receive the downlink broadcast transmission 225.

In some cases, the uplink transmission 220 may provide an approximate channel state feedback (e.g. a "rough" channel state) that may be used at the network entity 105-a to select the MCS, the transmit power, or both, of the upcoming downlink broadcast transmission 225 (e.g. broadcast PDSCH) accordingly. In some cases, the power consumption and overhead of the downlink broadcast transmission 225 may be reduced relative to values that would otherwise be used to provide reliable coverage to cell-edge UEs 115. For example, one or more UEs 115 may transmit associated uplink transmissions 220 that indicate corresponding channel states having relatively good channel conditions (e.g., due to none of the UEs 115 being at a cell edge). The network entity 105-*a* may then use a MCS and transmit power for the associated downlink broadcast transmission that is suitable for such relatively good channel conditions.

In some cases, the uplink transmission 220 may be a low-complexity signal that is transmitted when the UE 115-*a* is in an idle or inactive mode, and does not use closed-loop power or timing control techniques. In some cases, the signal provided in the uplink transmission 220 may be based on a random access channel (RACH) preamble or a sounding reference signa (SRS) sequence. In some cases, the uplink transmission 220 may provide an indication of an RSRP measured by the UE 115-*a* for the first downlink transmission 215. In some cases the first downlink transmission 215 may include a reference signal that may be used to measure RSRP. For example, the first downlink transmission 215 may be a keep-alive signal that includes a reference signal, the first downlink transmission 215 may be a SSB that allows synchronization signal measurement to determine RSRP, the first downlink transmission 215 may be a PEI with a demodulation reference signal (DMRS), or the first downlink transmission 215 may be a PDCCH with an associated DMRS. In some cases, two or more ranges of RSRP may be quantized via one or multiple thresholds, and the uplink transmission 220 may indicate the associated RSRP level. In some cases, the indication of the associated RSRP level may be indicated by selecting a sequence that is transmitted in the uplink transmission 220, such as by selecting a RACH preamble ID that is mapped to the RSRP level (e.g., different subsets of RACH preamble IDs may be associated with different RSRP levels), by selecting an amount of cyclic shift of the uplink transmission 220 (e.g., different cyclic shifts may be associated with different RSRP levels), by selecting a particular uplink resource for transmitting the uplink transmission 220 (e.g., different uplink resources may be associated with different RSRP levels), by selecting a particular occasions (e.g., in time and/or frequency) for the uplink transmission 220 (e.g., different transmission occasions may be associated with different RSRP levels), by selecting a transmit power for the uplink transmission 220, or any combinations thereof.

In some cases where a transmit power for the uplink transmission 220 is used (alone or in conjunction with one or more other parameters) to indicate the RSRP level, the uplink transmit power may be selected based on the measured RSRP and a configured target receive power, such that UEs 115 that are closer to the network entity 105-*a* transmit using lower power and UEs 115 that are further away from the network entity 105-*a* transmit using a higher power. In some cases, the target receive power may be selected such that the received power can implicitly carry some information such at the RSRP indication. In some cases, in order to avoid a strong uplink signal overpowering a weaker uplink signal, the target receive power may be configured such that an uplink signal from a UE 115 having a lower RSRP value is provided with a higher target receive power at the network entity. In other words, multiple target receive powers may be defined and be associated with different RSRP levels/thresholds, such that a higher target receive power is associated with lower measured RSRP levels. Such techniques may provide that the downlink broadcast transmission 225 is transmitted using enhanced (e.g., in terms of energy efficiency) MCS and transmit power that provides reliable communications for the lowest indicated RSRP values, and setting the target receive power in such a manner may enhance the likelihood that the uplink transmission 220 associated with the weakest measured RSRP is detectable at the network entity 105-*a*.

In some cases, the uplink transmission 220 may be transmitted without a timing advance that is applied by the UE 115-*a*. In such cases, the signals from UEs 115 at a farther distance from the network entity 105-*a* will arrive later than signals from closer UEs 115. In some cases, a receiver associated with the network entity 105-*a* may estimate receive timing (e.g., via a correlator process), and can associate different receive timings to different coverage distances or regions. The network entity 105-*a*, in some cases, may select a MCS and transmit power for the downlink broadcast transmission 225 based on the identified coverage distances or regions.

In some cases, the UE 115-*a* may be configured with one or more RSRP thresholds or levels, and mapping from the different RSRP thresholds or levels to different uplink transmission 220 parameters that indicate the RSRP. In some cases, the UE 115-*a* may be configured according to a preconfigured or specified set of RSRP thresholds and associated uplink transmission 220 parameters. In some cases, the UE 115-*a* may receive configuration information (e.g., from the network entity 105-*a*) with the one or more RSRP thresholds or levels and corresponding uplink transmission 220 parameters, such as via system information signaling (e.g., in a system information block (SIB) for PEI-response (PEI-R)), via a SSB or MIB such as for on-demand RMSI, via a corresponding PDCCH (e.g., for PEI-R and on-demand RMSI), via system information or dedicated RRC sent by a serving cell for one or more neighboring cells, or any combinations thereof.

Additionally, or alternatively, the uplink transmission 220 may include a preamble (e.g., based on a RACH preamble) and a payload (e.g., a PUSCH payload), where the payload provides feedback information related to channel quality. In such cases, more detailed channel feedback may be provided to allow for more accurate tuning of the downlink broadcast transmission 225 parameters. Further, in cases where interference may be present (e.g., in case of a full-duplex network entity 105-*a* or flexible/dynamic TDD), and the indicated channel quality metric may be based on an interference measurement (e.g., defined based on SINR levels, or level of interference or cross-link interference (CLI)). Additionally, or alternatively, techniques as discussed herein may be used for RACH messages, such as a random access response (RAR) message (e.g., MSG2). Further, in some cases, techniques as discussed herein may be used for requesting repetition for one or more associated downlink broadcast transmissions 225. For example, in cases where the uplink transmission 220 is an uplink trigger for on-demand SSB or on-demand RMSI, the uplink transmission 220 also may be used to select a configuration for RACH MSG1 and MSG3 (e.g., in terms of repetition, RACH preamble format, MCS of MSG3).

Figure 3:
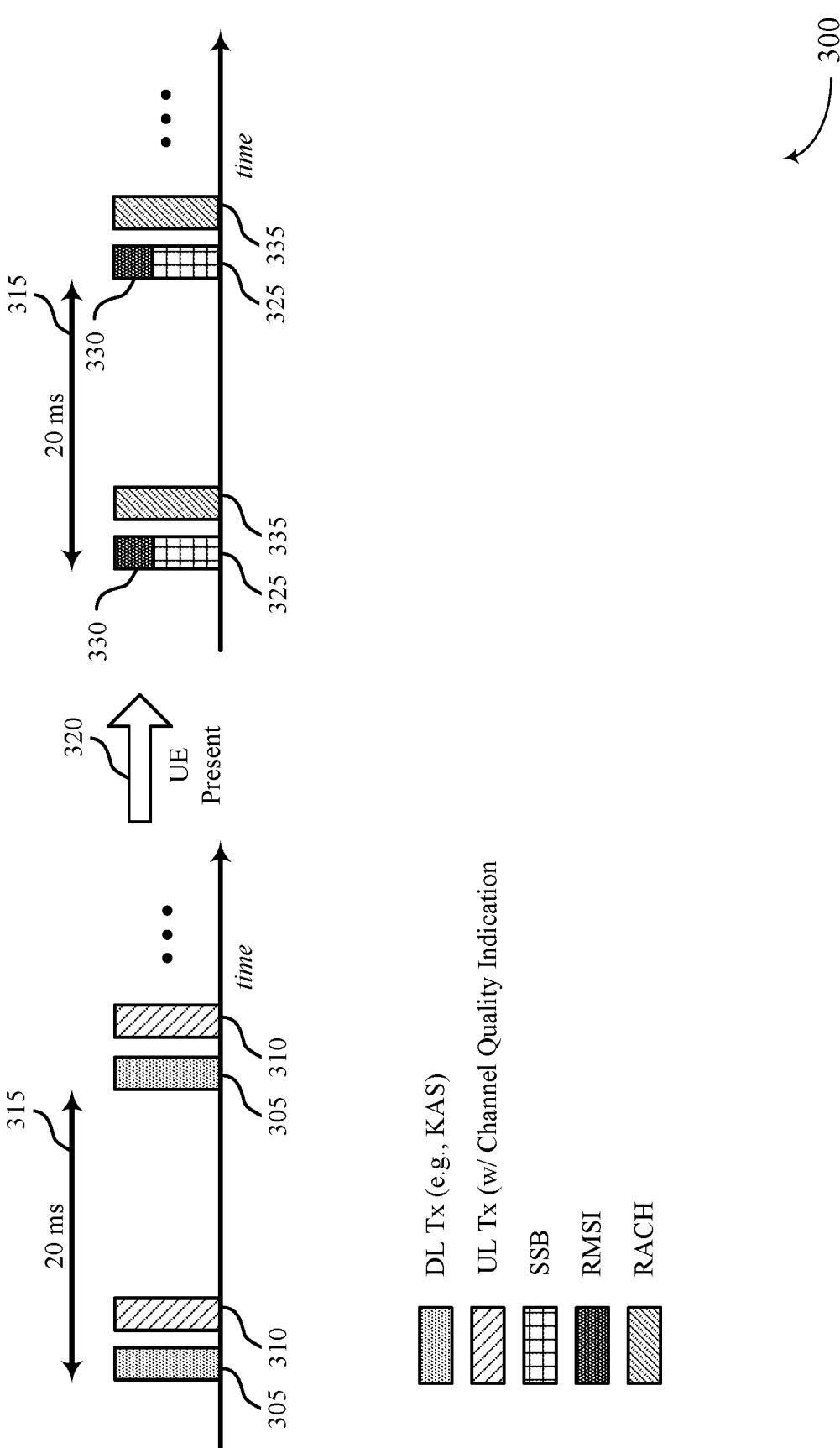
FIG. 3 illustrates an example of a uplink trigger scheme that supports techniques for link adaptation for broadcast channels in accordance with one or more aspects of the present disclosure.

FIG. 3 illustrates an example of a uplink trigger scheme 300 that supports techniques for link adaptation for broadcast channels in accordance with one or more aspects of the present disclosure. FIG. 3 may be an example of an on-demand SSB or RMSI scheme such as discussed with reference to FIGS. 1 and 2. For example, FIG. 3 illustrates an uplink trigger scheme 300 in which an uplink transmission that indicates channel information for a UE aids in selecting transmission parameters for one or more downlink broadcast transmissions.

In this example, a network entity (e.g., a network entity 105) may transmit periodic downlink transmissions 305, which may be examples of first downlink transmissions. In the example of FIG. 3, the periodic downlink transmissions 305 may be keep-alive signal (KAS) transmissions having a periodicity 315 of 20 ms. The KASs may be simple downlink reference signals carrying no or little information, and thus may consume relatively few resources and relatively low power. For example, a KAS may be a standalone primary synchronization signal (PSS) with an associated identification. If a UE detects a downlink transmission 305 and is seeking to establish a connection, the UE may transmit an uplink transmission 310 in an uplink resource that is associated with a detected instance of the downlink transmission 305. For example, the uplink transmission 310 may be an uplink trigger (ULT) that is transmitted to trigger a transmission of a SSB, RMSI, or both. In some cases, the ULT may be a simple uplink signal (e.g., a preamble transmission such as a RACH preamble). In some cases, the ULT may provide an indication to the network entity of channel quality measured at the UE for a downlink transmission 305, which may be used to select one or more transmission parameters for a subsequent downlink broadcast transmission. Further, the network entity may use a detected transmission direction of the ULT to identify one or more beams that may be used to transmit one or more subsequent downlink broadcast transmissions.

Based on the ULT, the network entity, at 320, may determine that one or more UEs are present and are to receive the downlink broadcast transmission. In this example, a ULT may trigger the network entity to transmit a SSB 325 and RMSI 330. As discussed, the SSB 325 and RMSI 330 may be transmitted using one or more transmission parameters that are based on the channel quality indication provided by the uplink transmission 310. The network entity may also activate associated RACH resources 335, and may monitor for RACH transmissions (e.g., from a direction associated with the uplink transmission 310). In this example, the SSB 325 and RMSI 330, and the associated RACH resources 335, may have a periodicity (e.g., a 20 ms periodicity, which may align with the periodicity of the KAS transmissions).

Figure 4:
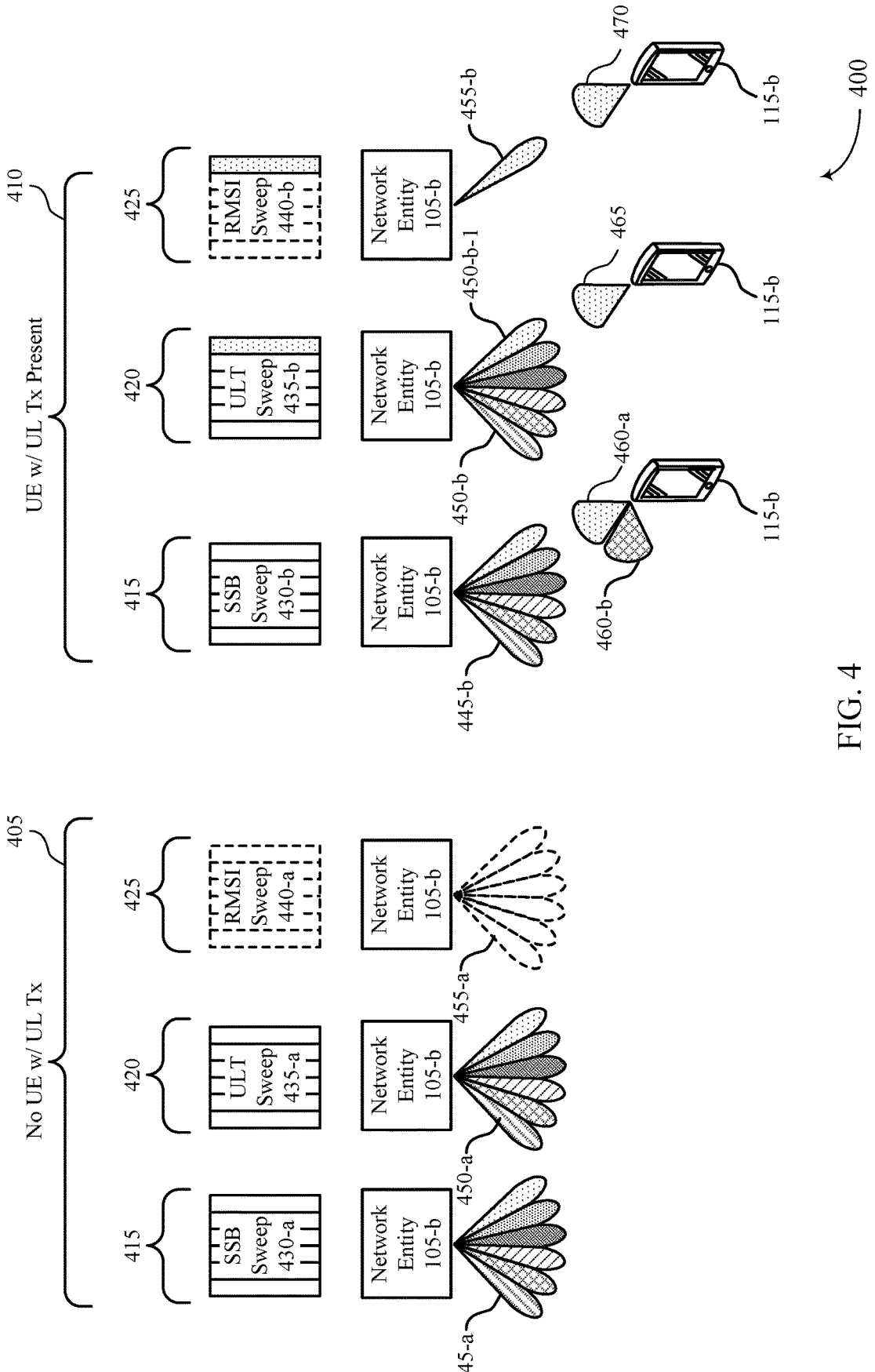
FIG. 4 illustrates an example of a system information transmission based on an uplink trigger that supports techniques for link adaptation for broadcast channels in accordance with one or more aspects of the present disclosure.

FIG. 4 illustrates an example of system information transmission based on an uplink trigger 400 that supports techniques for link adaptation for broadcast channels in accordance with one or more aspects of the present disclosure. FIG. 4 may be an example of an on-demand system information (e.g., RMSI) scheme such as discussed with reference to FIGS. 1 through 3. For example, FIG. 4 illustrates an uplink trigger scheme 400 that may support an uplink transmissions that indicate channel information for a UE that aids in selecting transmission parameters for one or more downlink broadcast transmissions.

In this example, a network entity 105-b may transmit periodic SSB transmissions 415, monitor for uplink transmissions 420 and, if an uplink trigger is detected, transmit associated system information transmissions 425. In the example of FIG. 4, a first instance 405 of the procedure may result in the network entity 105-b not detecting an uplink trigger transmission, and a second instance 410 of the procedure may result in the network entity 105-b detecting an uplink trigger from UE 115-b. For example, in the first instance 405, the network entity 105-b may perform an SSB sweep 430-a, in which SSBs are transmitted using multiple different SSB transmission beams 445-a. The network entity 105-b may then monitor for uplink triggers (ULTs) in ULT sweep 435-a, in which receive components at the network entity 105-b are the network entity 105-b are configured using parameters that correspond to the beamforming parameters of the SSB transmission beams 445-a (e.g. quasi-colocation (QCL) parameters) to identify ULTs via receive beams 450-a. In this example, the first instance 405 does not include any such ULTs, and thus the network entity 105-b does not transmit any system information transmissions 425 in a RMSI sweep 440-a using one or more system information beams 455-a. Thus, network power savings may be achieved, through transmission of system information transmissions 425 only in cases where an ULT is received. While this example illustrates a ULT for RMSI, techniques discussed herein may be used in other cases where a ULT may be used to initiate associated downlink transmissions, such as ULTs to trigger RMSI based on a control resource set (CORESET) that is transmitted (e.g., a CORESET0 transmission that provides control information for a system information block (SIB1) scheduling), or ULTs to trigger enhanced RMSI based on an enhanced RMSI indication in control information (e.g., in CORESET0). Further, techniques as discussed herein may be used in conjunction with a paging early indication response (PEI-R) to locate the spatial direction of the UE 115-b, where the PEI-R may provide both the spatial direction (e.g., based on a PEI-R response occasion in which the PEI-R is received, and an indication provided by the PEI-R of an associated channel quality).

Continuing with the example of FIG. 4, the second instance 405 may perform an SSB sweep 430-b, in which SSBs again are transmitted using multiple different SSB transmission beams 445-b. In this example, UE 115-b may monitor for the SSBs via UE receive beams 460 in a beam sweeping procedure. The UE 115-b may detect that SSB with a highest received power on a first UE receive beam 460-a. The UE 115-b may transmit a ULT via a first UE transmit beam 465 that corresponds to the first UE receive beam 460-a as part of ULT sweep 435-b. The network entity 105-b, when monitoring for ULTs via receive beams 450-b in ULT sweep 435-b, may detect the ULT from the UE 115-b via a corresponding receive beams 450-b-1. In accordance with various aspects discussed herein, the ULT from UE 115-b may provide an indication of a channel quality measured at the UE 115-b (e.g., in accordance with one or more of the techniques as discussed with reference to FIG. 2). The network entity 105-b, based on the received ULT and the indicated channel quality, may transmit a system information transmission 425 in RMSI sweep 440-b using a system information beams 455-b that corresponds to the receive beams 450-b-1 on which the ULT was detected, which may be received at the UE 115-b via UE receive beam 470. Thus, network power savings may be achieved through transmission of system information transmissions 425 only on system information beam 455-b that is associated with the detected ULT (and any other system information beams 455 if other ULTs are detected). Further, network power savings and system reliability and efficiency may be increased by setting transmission parameters for the system information transmissions 425 based in the channel quality indicated by the ULT from the UE 115-b. For example, if the ULT indicates a relatively good channel quality, a lower transmit power may be used for the corresponding system information transmission 425, a higher coding rate may be used for the corresponding system information transmission 425, a higher modulation order may be used for the corresponding system information transmission 425, or any combinations thereof.

Figure 5:
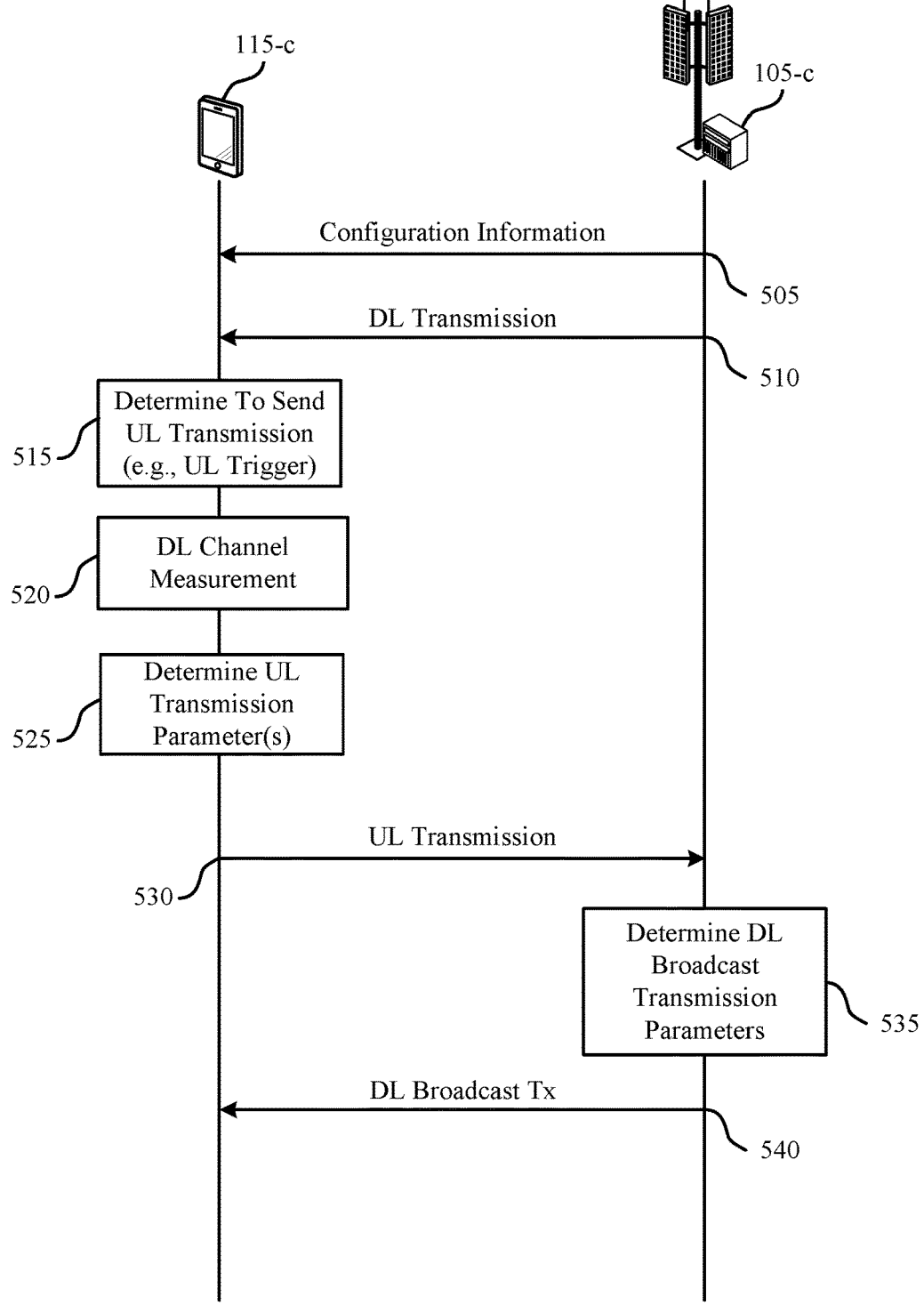
FIG. 5 illustrates an example of a process flow that supports techniques for link adaptation for broadcast channels in accordance with one or more aspects of the present disclosure.

FIG. 5 illustrates an example of a process flow 500 that supports techniques for link adaptation for broadcast channels in accordance with one or more aspects of the present disclosure. The process flow 500 may include various aspects of the present disclosure described with reference to FIGS. 1 through 4. For example, the process flow 500 may illustrate communications between a UE 115-*c* and a network entity 105-*c*, which may be examples of corresponding devices as described with reference to FIGS. 1 through 4. Alternative examples of the following may be implemented, where some steps are performed in a different order than described or are not performed at all. In some cases, a step may include additional features not mentioned below, or further steps may be added.

At 505, the network entity 105-*c* may transmit, and the UE 115-*c* may receive, configuration information. In some cases, the configuration information may include, in some cases, one or more RSRP thresholds or levels and a mapping from the different RSRP thresholds or levels to different uplink transmission parameters for an uplink transmission that indicates a measured RSRP. In some cases, the configuration information may indicate one or more RSRP thresholds or levels and corresponding uplink transmission parameters, such as via system information signaling (e.g., in a SIB for PEI-R), via a SSB or MIB such as for on-demand RMSI, via a corresponding PDCCH (e.g., for PEI-R and on-demand RMSI), via system information or dedicated RRC sent by a serving cell for one or more neighboring cells, or any combinations thereof.

At 510, the network entity 105-*c* may transmit, and the UE 115-*c* may receive, one or more downlink transmissions. Such downlink transmissions may include, for example, SSBs as part of an SSB sweep, downlink control information (e.g., CORESET0), a PEI, or one or more keep-alive signals.

At 515, the UE 115-*c* may determine to transmit an uplink transmission, such as an uplink trigger. In some cases, the UE 115-*c* may make such a determination based on data that is present in an uplink buffer at the UE 115-*c*, or based on a received PEI. At 520, the UE 115-*c* may measure one or more channel characteristics associated with the received downlink transmission. For example, the UE 115-*c* may measure a RSRP of a reference signal included with the downlink transmission. In some cases, additionally or alternatively, the UE 115-*c* may measure interference associated with the downlink transmissions (e.g., an SINR in cases where full-duplex communications are used at the network entity 105-*c* or UE 115-*c*).

At 525, the UE 115-*c* may determine one or more uplink transmission parameters for an associated uplink transmission based on the downlink channel measurement, in accordance with techniques as discussed herein. For example, the UE 115-*c* may determine an uplink transmit power, a sequence of bits, uplink resources, or any combinations thereof, based on the downlink channel measurement.

At 530, the UE 115-*c* may transmit the uplink transmission. In some cases, the uplink transmission may be an uplink trigger (e.g., to trigger on-demand SSB or on-demand RMSI), or may be a PEI-R. At 535, the network entity 105-*c* may determine one or more downlink broadcast transmission parameters based on the received uplink transmission from the UE 115-*c*, and any other associated uplink transmissions from other UEs. In some cases, the network entity 105-*c* may determine one or more of a downlink transmit power, an MCS for the downlink broadcast transmission, or any combinations thereof. At 540, the network entity 105-*c* may transmit the downlink broadcast transmission to the UE 115-*c*, and any other UEs that are to receive the downlink broadcast transmission.

FIG. 6 shows a block diagram 600 of a device 605 that supports techniques for link adaptation for broadcast channels in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for link adaptation for broadcast channels). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for link adaptation for broadcast channels). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for link adaptation for broadcast channels as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a first downlink transmission from a network entity. The communications manager 620 may be configured as or otherwise support a means for transmitting an uplink communication based on receiving the first downlink transmission, the uplink communication provides a channel quality indication that is based on a measured channel quality of the first downlink transmission. The communications manager 620 may be configured as or otherwise support a means for receiving a downlink broadcast transmission, where the downlink broadcast transmission has one or more transmission parameters that are based on the channel quality indication.

Additionally, or alternatively, the communications manager 620 may support wireless communication at a network entity in accordance with examples as disclosed herein. For example, the communications manager 620 may be configured as or otherwise support a means for transmitting a first downlink transmission to at least a first UE. The communications manager 620 may be configured as or otherwise support a means for receiving a first uplink communication from the first UE, the first uplink communication providing a first channel quality indication of a measured channel quality of the first downlink transmission at the first UE. The communications manager 620 may be configured as or otherwise support a means for transmitting a downlink broadcast transmission to at least the first user equipment, where the downlink broadcast transmission has one or more transmission parameters that are based on the first channel quality indication.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for broadcast channel link adaptation that provide enhanced system efficiency, reduced overhead, reduced power consumption, or any combinations thereof, while providing reliable communications.

Figure 7:
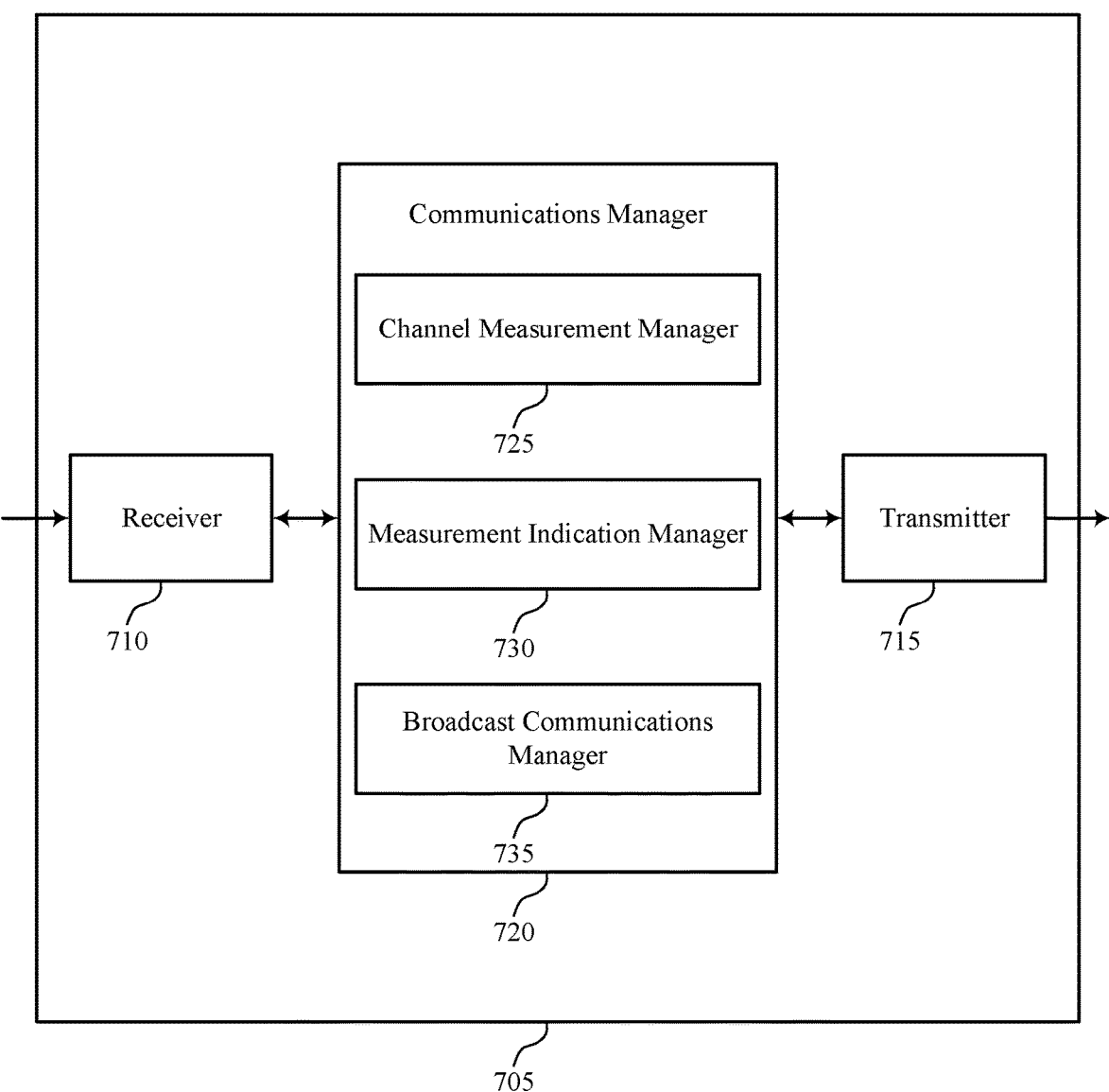

FIG. 7 shows a block diagram 700 of a device 705 that supports techniques for link adaptation for broadcast channels in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for link adaptation for broadcast channels). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for link adaptation for broadcast channels). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for link adaptation for broadcast channels as described herein. For example, the communications manager 720 may include a channel measurement manager 725, a measurement indication manager 730, a broadcast communications manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The channel measurement manager 725 may be configured as or otherwise support a means for receiving a first downlink transmission from a network entity. The measurement indication manager 730 may be configured as or otherwise support a means for transmitting an uplink communication based on receiving the first downlink transmission, the uplink communication provides a channel quality indication that is based on a measured channel quality of the first downlink transmission. The broadcast communications manager 735 may be configured as or otherwise support a means for receiving a downlink broadcast transmission, where the downlink broadcast transmission has one or more transmission parameters that are based on the channel quality indication.

Additionally, or alternatively, the communications manager 720 may support wireless communication at a network entity in accordance with examples as disclosed herein. The broadcast communications manager 735 may be configured as or otherwise support a means for transmitting a first downlink transmission to at least a first UE. The measurement indication manager 730 may be configured as or otherwise support a means for receiving a first uplink communication from the first UE, the first uplink communication providing a first channel quality indication of a measured channel quality of the first downlink transmission at the first UE. The broadcast communications manager 735 may be configured as or otherwise support a means for transmitting a downlink broadcast transmission to at least the first user equipment, where the downlink broadcast transmission has one or more transmission parameters that are based on the first channel quality indication.

Figure 8:
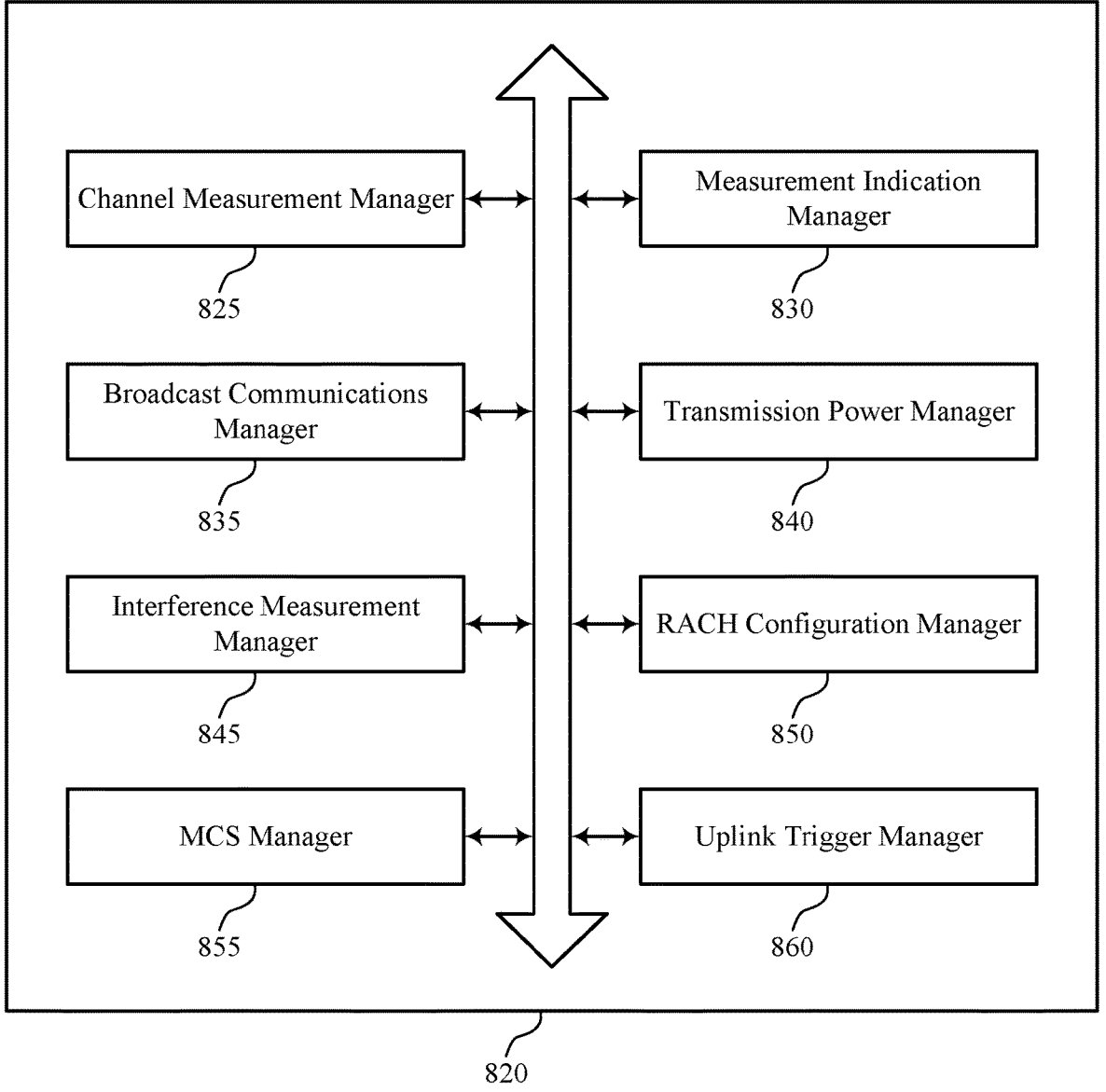
FIG. 8 shows a block diagram of a communications manager that supports techniques for link adaptation for broadcast channels in accordance with one or more aspects of the present disclosure.

FIG. 8 shows a block diagram 800 of a communications manager 820 that supports techniques for link adaptation for broadcast channels in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for link adaptation for broadcast channels as described herein. For example, the communications manager 820 may include a channel measurement manager 825, a measurement indication manager 830, a broadcast communications manager 835, a transmission power manager 840, an interference measurement manager 845, a RACH configuration manager 850, an MCS manager 855, an uplink trigger manager 860, or any combination thereof. Each of these components may communicate, directly or indirectly, with one another (e.g., via one or more buses).

The communications manager 820 may support wireless communication at a UE in accordance with examples as disclosed herein. The channel measurement manager 825 may be configured as or otherwise support a means for receiving a first downlink transmission from a network entity. The measurement indication manager 830 may be configured as or otherwise support a means for transmitting an uplink communication based on receiving the first downlink transmission, the uplink communication provides a channel quality indication that is based on a measured channel quality of the first downlink transmission. The broadcast communications manager 835 may be configured as or otherwise support a means for receiving a downlink broadcast transmission, where the downlink broadcast transmission has one or more transmission parameters that are based on the channel quality indication.

In some examples, to support receiving the downlink broadcast transmission, the broadcast communications manager 835 may be configured as or otherwise support a means for decoding the downlink broadcast transmission based on a modulation and coding scheme that is selected based on the channel quality indication. In some examples, the downlink broadcast transmission includes a RMSI shared channel transmission, a paging shared channel transmission, or a RACH response. In some examples, the uplink communication includes a trigger for an on-demand SSB transmission or an on-demand RMSI transmission, or the uplink communication includes a PEI response.

In some examples, to support transmitting the uplink communication, the transmission power manager 840 may be configured as or otherwise support a means for setting an uplink transmit power for the uplink communication based on an open-loop power control technique. In some examples, to support transmitting the uplink communication, the transmission power manager 840 may be configured as or otherwise support a means for transmitting the uplink communication using a transmission timing without an associated timing advance. In some examples, the channel measurement manager 825 may be configured as or otherwise support a means for measuring a RSRP associated with the first downlink transmission, and where the channel quality indication is based on the RSRP. In some examples, the measurement indication manager 830 may be configured as or otherwise support a means for selecting the channel quality indication from a set of available channel quality indications based on the RSRP and a set of RSRP threshold values that are mapped to the set of available channel quality indications.

In some examples, the measurement indication manager 830 may be configured as or otherwise support a means for selecting, based on the channel quality indication, one or more of a sequence that is included in the uplink communication, a first uplink transmission resource of the uplink resources for transmission of the uplink communication, or a target receive power for the uplink communication. In some examples, one or more measured channel quality thresholds and associated mappings to the channel quality indication are provided to the UE in a prespecified configuration, a system information communication, a SSB communication, a MIB communication, a control channel communication associated with the first downlink transmission, a communication from a serving cell for one or more neighboring cells, or any combinations thereof. In some examples, the channel quality indication is provided in a payload of the uplink communication. In some examples, the payload of the uplink communication includes one or more bits of a payload field, and different bit values associated with the payload field are mapped to different channel quality thresholds. In some examples, the channel quality indication provides an interference indication that is based on a detected level of interference associated with the first downlink transmission. In some examples, the uplink communication indicates a transmission beam associated with the UE for the downlink broadcast transmission.

In some examples, the RACH configuration manager 850 may be configured as or otherwise support a means for selecting a RACH configuration based on the channel quality indication, the RACH configuration including one or more of a message-1 (MSG1) or message-3 (MSG3) format, a RACH preamble format, a number of repetitions for RACH messages, a modulation and coding scheme (MCS) for RACH messages, or any combinations thereof.

Additionally, or alternatively, the communications manager 820 may support wireless communication at a network entity in accordance with examples as disclosed herein. In some examples, the broadcast communications manager 835 may be configured as or otherwise support a means for transmitting a first downlink transmission to at least a first UE. In some examples, the measurement indication manager 830 may be configured as or otherwise support a means for receiving a first uplink communication from the first UE, the first uplink communication providing a first channel quality indication of a measured channel quality of the first downlink transmission at the first UE. In some examples, the broadcast communications manager 835 may be configured as or otherwise support a means for transmitting a downlink broadcast transmission to at least the first user equipment, where the downlink broadcast transmission has one or more transmission parameters that are based on the first channel quality indication.

In some examples, to support transmitting the downlink broadcast transmission, the MCS manager 855 may be configured as or otherwise support a means for encoding the downlink broadcast transmission based on a modulation and coding scheme that is selected based on the first channel quality indication. In some examples, the downlink broadcast transmission includes a RMSI shared channel transmission, a paging shared channel transmission, or a RACH response. In some examples, the first uplink communication includes a trigger for an on-demand SSB transmission or an on-demand RMSI transmission, or the first uplink communication includes a PEI response. In some examples, an uplink transmit power for the first uplink communication is based on an open-loop power control technique, and the first uplink communication is transmitted using a transmission timing without an associated timing advance.

In some examples, the first channel quality indication provides a RSRP associated with the first downlink transmission. In some examples, the measurement indication manager 830 may be configured as or otherwise support a means for configuring the first UE with a set of available channel quality indications and an associated set of RSRP threshold values that are mapped to the set of available channel quality indications. In some examples, the measurement indication manager 830 may be configured as or otherwise support a means for determining the one or more transmission parameters for the downlink broadcast transmission based on one or more of a sequence that is included in the first uplink communication, a first uplink transmission resource of the uplink resources used for the first uplink communication, or a received power of the first uplink communication.

In some examples, the MCS manager 855 may be configured as or otherwise support a means for determining one or more of a modulation and coding scheme, or a downlink transmit power for the downlink broadcast transmission, based on a first time of arrival of the first uplink communication relative to one or more other times of arrival of one or more other uplink communications from one or more other UEs. In some examples, one or more measured channel quality thresholds and associated mappings to the first channel quality indication are provided to the UE in a prespecified configuration, a system information communication, a SSB communication, a MIB communication, a control channel communication associated with the first downlink transmission, a communication from a serving cell for one or more neighboring cells, or any combinations thereof. In some examples, the first channel quality indication is provided in a payload of the first uplink communication. In some examples, the payload of the first uplink communication includes one or more bits of a payload field, and different bit values associated with the payload field are mapped to different channel quality thresholds. In some examples, the first channel quality indication also provides an interference indication that is based on a detected level of interference associated with the first downlink transmission.

Figure 9:
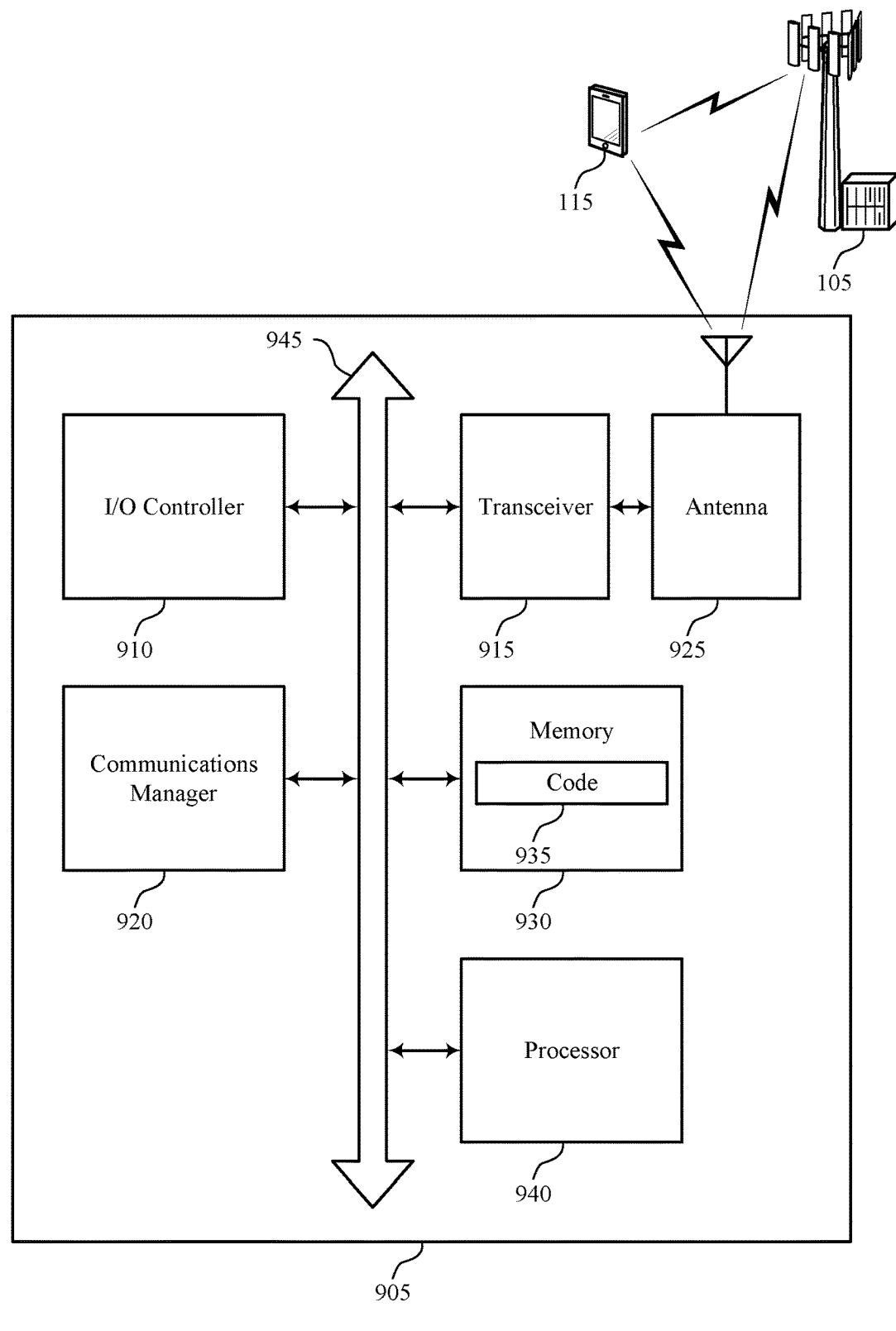
FIG. 9 shows a diagram of a system including a device that supports techniques for link adaptation for broadcast channels in accordance with one or more aspects of the present disclosure.

FIG. 9 shows a diagram of a system 900 including a device 905 that supports techniques for link adaptation for broadcast channels in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for link adaptation for broadcast channels). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a first downlink transmission from a network entity. The communications manager 920 may be configured as or otherwise support a means for transmitting an uplink communication based on receiving the first downlink transmission, the uplink communication provides a channel quality indication that is based on a measured channel quality of the first downlink transmission. The communications manager 920 may be configured as or otherwise support a means for receiving a downlink broadcast transmission, where the downlink broadcast transmission has one or more transmission parameters that are based on the channel quality indication.

Additionally, or alternatively, the communications manager 920 may support wireless communication at a network entity in accordance with examples as disclosed herein. For example, the communications manager 920 may be configured as or otherwise support a means for transmitting a first downlink transmission to at least a first UE. The communications manager 920 may be configured as or otherwise support a means for receiving a first uplink communication from the first UE, the first uplink communication providing a first channel quality indication of a measured channel quality of the first downlink transmission at the first UE. The communications manager 920 may be configured as or otherwise support a means for transmitting a downlink broadcast transmission to at least the first user equipment, where the downlink broadcast transmission has one or more transmission parameters that are based on the first channel quality indication.

By including or configuring the communications manager 920 in accordance with examples as described herein, the device 905 may support techniques for broadcast channel link adaptation that provide enhanced system efficiency, reduced overhead, reduced power consumption, or any combinations thereof, while providing reliable communications and an enhanced user experience.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for link adaptation for broadcast channels as described herein, or the processor 940 and the memory 930 may be otherwise configured to perform or support such operations.

Figure 10:
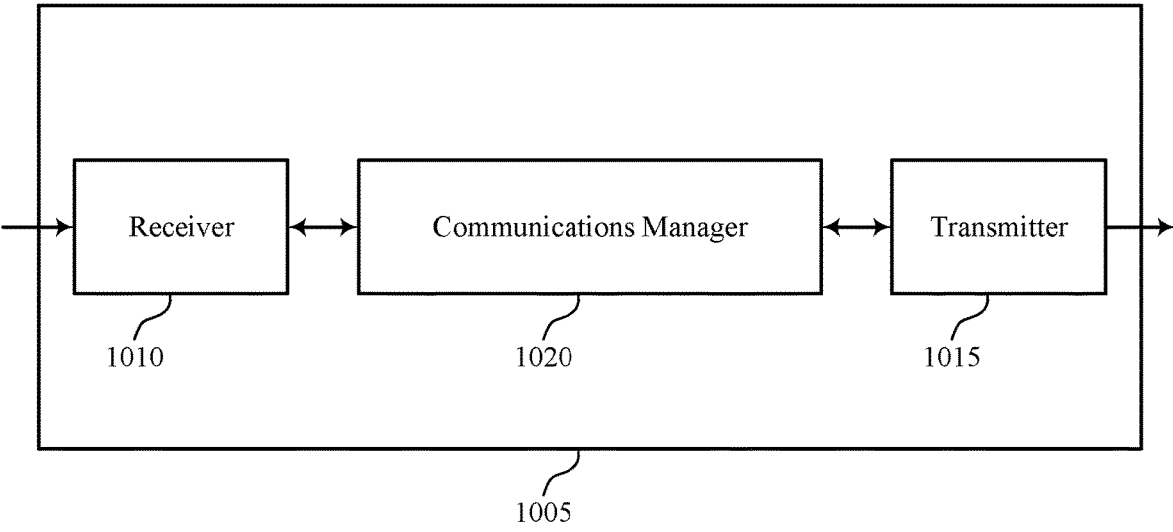

FIG. 10 shows a block diagram 1000 of a device 1005 that supports techniques for link adaptation for broadcast channels in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for link adaptation for broadcast channels as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting a first downlink transmission to at least a first UE. The communications manager 1020 may be configured as or otherwise support a means for receiving a first uplink communication from the first UE, the first uplink communication providing a first channel quality indication of a measured channel quality of the first downlink transmission at the first UE. The communications manager 1020 may be configured as or otherwise support a means for transmitting a downlink broadcast transmission to at least the first user equipment, where the downlink broadcast transmission has one or more transmission parameters that are based on the first channel quality indication.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for broadcast channel link adaptation that provide enhanced system efficiency, reduced overhead, reduced power consumption, or any combinations thereof, while providing reliable communications.

FIG. 11 shows a block diagram 1100 of a device 1105 that supports techniques for link adaptation for broadcast channels in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter

1115 and the receiver 1110 may be co-located in a transceiver, which may include or be coupled with a modem.

The device 1105, or various components thereof, may be an example of means for performing various aspects of techniques for link adaptation for broadcast channels as described herein. For example, the communications manager 1120 may include a broadcast communications manager 1125 a measurement indication manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The broadcast communications manager 1125 may be configured as or otherwise support a means for transmitting a first downlink transmission to at least a first UE. The measurement indication manager 1130 may be configured as or otherwise support a means for receiving a first uplink communication from the first UE, the first uplink communication providing a first channel quality indication of a measured channel quality of the first downlink transmission at the first UE. The broadcast communications manager 1125 may be configured as or otherwise support a means for transmitting a downlink broadcast transmission to at least the first user equipment, where the downlink broadcast transmission has one or more transmission parameters that are based on the first channel quality indication.

Figure 12:
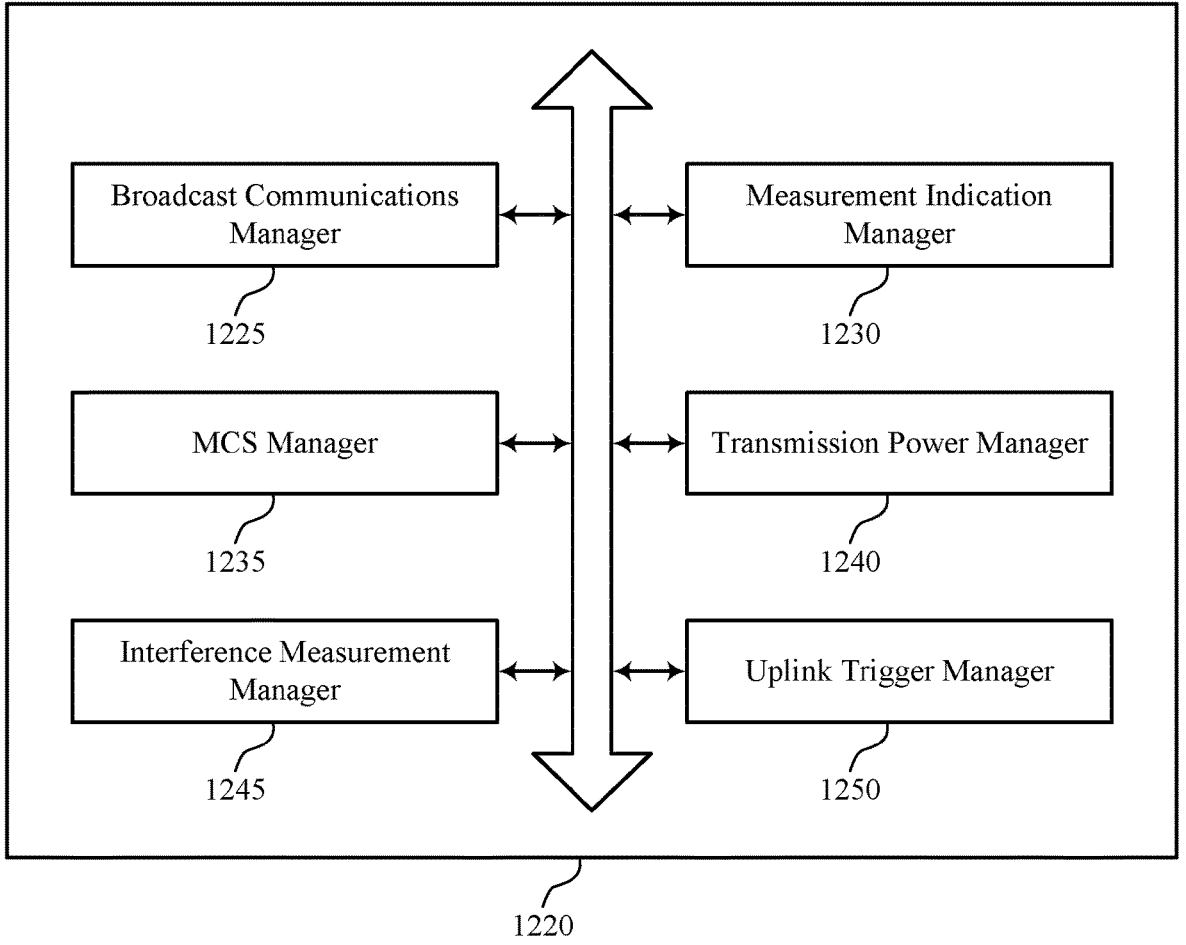
FIG. 12 shows a block diagram of a communications manager that supports techniques for link adaptation for broadcast channels in accordance with one or more aspects of the present disclosure.

FIG. 12 shows a block diagram 1200 of a communications manager 1220 that supports techniques for link adaptation for broadcast channels in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for link adaptation for broadcast channels as described herein. For example, the communications manager 1220 may include a broadcast communications manager 1225, a measurement indication manager 1230, an MCS manager 1235, a transmission power manager 1240, an interference measurement manager 1245, an uplink trigger manager 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The broadcast communications manager 1225 may be configured as or otherwise support a means for transmitting a first downlink transmission to at least a first UE. The measurement indication manager 1230 may be configured as or otherwise support a means for receiving a first uplink communication from the first UE, the first uplink communication providing a first channel quality indication of a measured channel quality of the first downlink transmission at the first UE. In some examples, the broadcast communications manager 1225 may be configured as or otherwise support a means for transmitting a downlink broadcast transmission to at least the first user equipment, where the downlink broadcast transmission has one or more transmission parameters that are based on the first channel quality indication.

In some examples, to support transmitting the downlink broadcast transmission, the MCS manager 1235 may be configured as or otherwise support a means for encoding the downlink broadcast transmission based on a modulation and coding scheme that is selected based on the first channel quality indication. In some examples, the downlink broadcast transmission includes a RMSI shared channel transmission, a paging shared channel transmission, or a RACH response. In some examples, the first uplink communication includes a trigger for an on-demand SSB transmission or an on-demand RMSI transmission, or the first uplink communication includes a PEI response. In some examples, an uplink transmit power for the first uplink communication is based on an open-loop power control technique, and the first uplink communication is transmitted using a transmission timing without an associated timing advance.

In some examples, the first channel quality indication provides a RSRP associated with the first downlink transmission. In some examples, the measurement indication manager 1230 may be configured as or otherwise support a means for configuring the first UE with a set of available channel quality indications and an associated set of RSRP threshold values that are mapped to the set of available channel quality indications. In some examples, the measurement indication manager 1230 may be configured as or otherwise support a means for determining the one or more transmission parameters for the downlink broadcast transmission based on one or more of a sequence that is included in the first uplink communication, a first uplink transmission resource of the uplink resources used for the first uplink communication, or a received power of the first uplink communication.

In some examples, the MCS manager 1235 may be configured as or otherwise support a means for determining one or more of a modulation and coding scheme, or a downlink transmit power for the downlink broadcast transmission, based on a first time of arrival of the first uplink communication relative to one or more other times of arrival of one or more other uplink communications from one or more other UEs. In some examples, one or more measured channel quality thresholds and associated mappings to the first channel quality indication are provided to the UE in a prespecified configuration, a system information communication, a SSB communication, a MIB communication, a control channel communication associated with the first downlink transmission, a communication from a serving cell for one or more neighboring cells, or any combinations thereof. In some examples, the first channel quality indication is provided in a payload of the first uplink communication. In some examples, the payload of the first uplink communication includes one or more bits of a payload field, and different bit values associated with the payload field are mapped to different channel quality thresholds. In some examples, the first channel quality indication also provides an interference indication that is based on a detected level of interference associated with the first downlink transmission.

Figure 13:
FIG. 13 shows a diagram of a system including a device that supports techniques for link adaptation for broadcast channels in accordance with one or more aspects of the present disclosure.

FIG. 13 shows a diagram of a system 1300 including a device 1305 that supports techniques for link adaptation for broadcast channels in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for link adaptation for broadcast channels). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting a first downlink transmission to at least a first UE. The communications manager 1320 may be configured as or otherwise support a means for receiving a first uplink communication from the first UE, the first uplink communication providing a first channel quality indication of a measured channel quality of the first downlink transmission at the first UE. The communications manager 1320 may be configured as or otherwise support a means for transmitting a downlink broadcast transmission to at least the first user equipment, where the downlink broadcast transmission has one or more transmission parameters that are based on the first channel quality indication.

By including or configuring the communications manager 1320 in accordance with examples as described herein, the device 1305 may support techniques for broadcast channel link adaptation that provide enhanced system efficiency, reduced overhead, reduced power consumption, or any combinations thereof, while providing reliable communications.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of techniques for link adaptation for broadcast channels as described herein, or the processor 1335 and the memory 1325 may be otherwise configured to perform or support such operations.

FIG. 14 shows a flowchart illustrating a method 1400 that supports techniques for link adaptation for broadcast channels in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first downlink transmission from a network entity. The operations of 1405 may be performed in accordance with examples as disclosed herein. In some examples, aspects of the operations of 1405 may be performed by a channel measurement manager 825 as described with reference to FIG. 8.

At 1410, the method may include transmitting an uplink communication based on receiving the first downlink transmission, the uplink communication provides a channel quality indication that is based on a measured channel quality of the first downlink transmission. The operations of 1410 may be performed in accordance with examples as disclosed herein. In some examples, aspects of the operations of 1410 may be performed by a measurement indication manager 830 as described with reference to FIG. 8.

At 1415, the method may include receiving a downlink broadcast transmission, where the downlink broadcast transmission has one or more transmission parameters that are based on the channel quality indication. The operations of 1415 may be performed in accordance with examples as disclosed herein. In some examples, aspects of the operations of 1415 may be performed by a broadcast communications manager 835 as described with reference to FIG. 8.

Figure 15:
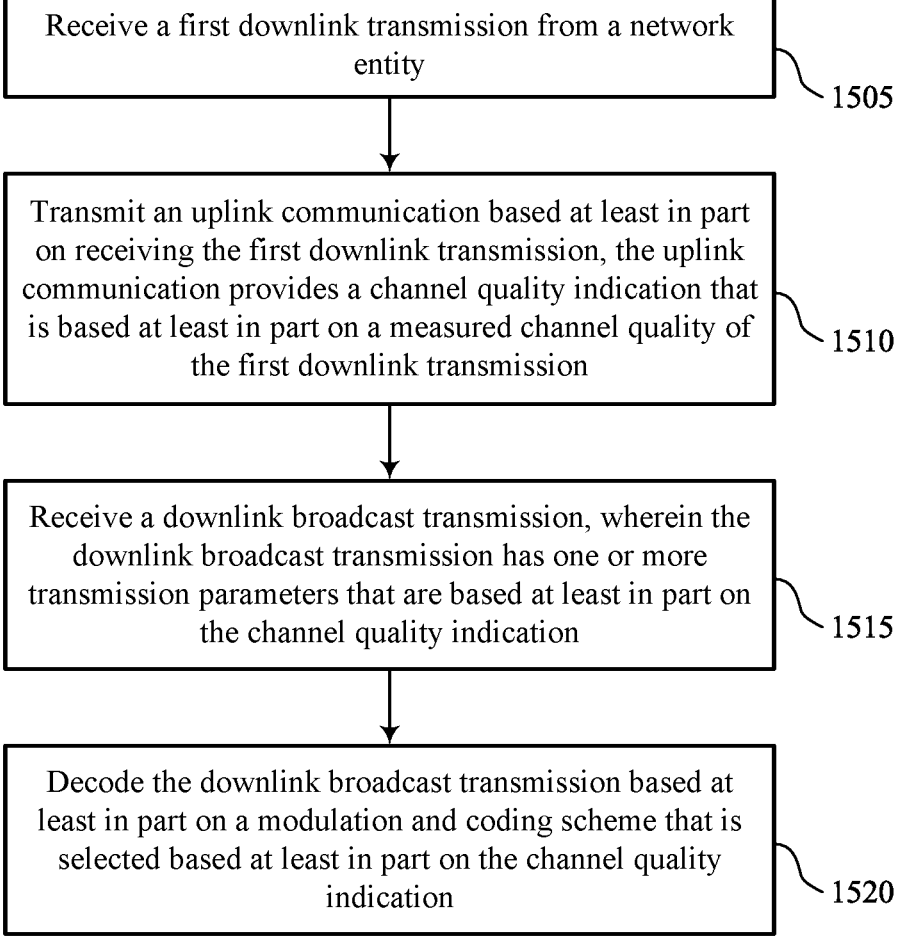

FIG. 15 shows a flowchart illustrating a method 1500 that supports techniques for link adaptation for broadcast channels in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first downlink transmission from a network entity. The operations of 1505 may be performed in accordance with examples as disclosed herein. In some examples, aspects of the operations of 1505 may be performed by a channel measurement manager 825 as described with reference to FIG. 8.

At 1510, the method may include transmitting an uplink communication based on receiving the first downlink transmission, the uplink communication provides a channel quality indication that is based on a measured channel quality of the first downlink transmission. The operations of 1510 may be performed in accordance with examples as disclosed herein. In some examples, aspects of the operations of 1510 may be performed by a measurement indication manager 830 as described with reference to FIG. 8.

At 1515, the method may include receiving a downlink broadcast transmission, where the downlink broadcast transmission has one or more transmission parameters that are based on the channel quality indication. The operations of 1515 may be performed in accordance with examples as disclosed herein. In some examples, aspects of the operations of 1515 may be performed by a broadcast communications manager 835 as described with reference to FIG. 8.

At 1520, the method may include decoding the downlink broadcast transmission based on a modulation and coding scheme that is selected based on the channel quality indication. The operations of 1520 may be performed in accordance with examples as disclosed herein. In some examples, aspects of the operations of 1520 may be performed by a broadcast communications manager 835 as described with reference to FIG. 8.

FIG. 16 shows a flowchart illustrating a method 1600 that supports techniques for link adaptation for broadcast channels in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a first downlink transmission from a network entity. The operations of 1605 may be performed in accordance with examples as disclosed herein. In some examples, aspects of the operations of 1605 may be performed by a channel measurement manager 825 as described with reference to FIG. 8.

At 1610, the method may include setting an uplink transmit power for the uplink communication based on an open-loop power control technique. The operations of 1610 may be performed in accordance with examples as disclosed herein. In some examples, aspects of the operations of 1610 may be performed by a transmission power manager 840 as described with reference to FIG. 8.

At 1615, the method may include transmitting an uplink communication based on receiving the first downlink transmission, the uplink communication provides a channel quality indication that is based on a measured channel quality of the first downlink transmission. The operations of 1615 may be performed in accordance with examples as disclosed herein. In some examples, aspects of the operations of 1615 may be performed by a measurement indication manager 830 as described with reference to FIG. 8. In some cases, the uplink communication may use a transmission timing without an associated timing advance.

At 1620, the method may include receiving a downlink broadcast transmission, where the downlink broadcast transmission has one or more transmission parameters that are based on the channel quality indication. The operations of

1620 may be performed in accordance with examples as disclosed herein. In some examples, aspects of the operations of 1620 may be performed by a broadcast communications manager 835 as described with reference to FIG. 8.

FIG. 17 shows a flowchart illustrating a method 1700 that supports techniques for link adaptation for broadcast channels in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving a first downlink transmission from a network entity. The operations of 1705 may be performed in accordance with examples as disclosed herein. In some examples, aspects of the operations of 1705 may be performed by a channel measurement manager 825 as described with reference to FIG. 8.

At 1710, the method may include measuring a RSRP associated with the first downlink transmission. The operations of 1710 may be performed in accordance with examples as disclosed herein. In some examples, aspects of the operations of 1710 may be performed by a channel measurement manager 825 as described with reference to FIG. 8.

At 1715, the method may include selecting a channel quality indication from a set of available channel quality indications based on the RSRP and a set of RSRP threshold values that are mapped to the set of available channel quality indications. The operations of 1715 may be performed in accordance with examples as disclosed herein. In some examples, aspects of the operations of 1715 may be performed by a measurement indication manager 830 as described with reference to FIG. 8.

At 1720, the method may include selecting, based on the channel quality indication, one or more of a sequence that is included in an uplink communication, a first uplink transmission resource of the uplink resources for transmission of the uplink communication, or a target receive power for the uplink communication. The operations of 1720 may be performed in accordance with examples as disclosed herein. In some examples, aspects of the operations of 1720 may be performed by a measurement indication manager 830 as described with reference to FIG. 8.

At 1725, the method may include transmitting the uplink communication. The operations of 1725 may be performed in accordance with examples as disclosed herein. In some examples, aspects of the operations of 1725 may be performed by a measurement indication manager 830 as described with reference to FIG. 8.

At 1730, the method may include receiving a downlink broadcast transmission, where the downlink broadcast transmission has one or more transmission parameters that are based on the channel quality indication. The operations of 1730 may be performed in accordance with examples as disclosed herein. In some examples, aspects of the operations of 1730 may be performed by a broadcast communications manager 835 as described with reference to FIG. 8.

FIG. 18 shows a flowchart illustrating a method 1800 that supports techniques for link adaptation for broadcast channels in accordance with one or more aspects of the present disclosure. The operations of the method 1800 may be implemented by a UE or a network entity or its components as described herein. For example, the operations of the method 1800 may be performed by a UE 115 as described with reference to FIGS. 1 through 9 or a network entity as described with reference to FIGS. 1 through 5 and 10 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1805, the method may include transmitting a first downlink transmission to at least a first UE. The operations of 1805 may be performed in accordance with examples as disclosed herein. In some examples, aspects of the operations of 1805 may be performed by a broadcast communications manager 835 or a broadcast communications manager 1225 as described with reference to FIGS. 8 and 12.

At 1810, the method may include receiving a first uplink communication from the first UE, the first uplink communication providing a first channel quality indication of a measured channel quality of the first downlink transmission at the first UE. The operations of 1810 may be performed in accordance with examples as disclosed herein. In some examples, aspects of the operations of 1810 may be performed by a measurement indication manager 830 or a measurement indication manager 1230 as described with reference to FIGS. 8 and 12.

At 1815, the method may include transmitting a downlink broadcast transmission to at least the first user equipment, where the downlink broadcast transmission has one or more transmission parameters that are based on the first channel quality indication. The operations of 1815 may be performed in accordance with examples as disclosed herein. In some examples, aspects of the operations of 1815 may be performed by a broadcast communications manager 835 or a broadcast communications manager 1225 as described with reference to FIGS. 8 and 12.

FIG. 19 shows a flowchart illustrating a method 1900 that supports techniques for link adaptation for broadcast channels in accordance with one or more aspects of the present disclosure. The operations of the method 1900 may be implemented by a UE or a network entity or its components as described herein. For example, the operations of the method 1900 may be performed by a UE 115 as described with reference to FIGS. 1 through 9 or a network entity as described with reference to FIGS. 1 through 5 and 10 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1905, the method may include transmitting a first downlink transmission to at least a first UE. The operations of 1905 may be performed in accordance with examples as disclosed herein. In some examples, aspects of the operations of 1905 may be performed by a broadcast communications manager 835 or a broadcast communications manager 1225 as described with reference to FIGS. 8 and 12.

At 1910, the method may include receiving a first uplink communication from the first UE, the first uplink communication providing a first channel quality indication of a measured channel quality of the first downlink transmission at the first UE. The operations of 1910 may be performed in accordance with examples as disclosed herein. In some examples, aspects of the operations of 1910 may be performed by a measurement indication manager 830 or a measurement indication manager 1230 as described with reference to FIGS. 8 and 12.

At 1915, the method may include encoding the downlink broadcast transmission based on a modulation and coding scheme that is selected based on the first channel quality indication. The operations of 1915 may be performed in accordance with examples as disclosed herein. In some examples, aspects of the operations of 1915 may be performed by an MCS manager 855 or an MCS manager 1235 as described with reference to FIGS. 8 and 12.

At 1920, the method may include transmitting a downlink broadcast transmission to at least the first user equipment, where the downlink broadcast transmission has one or more transmission parameters that are based on the first channel quality indication. The operations of 1920 may be performed in accordance with examples as disclosed herein. In some examples, aspects of the operations of 1920 may be performed by a broadcast communications manager 835 or a broadcast communications manager 1225 as described with reference to FIGS. 8 and 12.

FIG. 20 shows a flowchart illustrating a method 2000 that supports techniques for link adaptation for broadcast channels in accordance with one or more aspects of the present disclosure. The operations of the method 2000 may be implemented by a UE or a network entity or its components as described herein. For example, the operations of the method 2000 may be performed by a UE 115 as described with reference to FIGS. 1 through 9 or a network entity as described with reference to FIGS. 1 through 5 and 10 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2005, the method may include configuring the first UE with a set of available channel quality indications and an associated set of RSRP threshold values that are mapped to the set of available channel quality indications. The operations of 2005 may be performed in accordance with examples as disclosed herein. In some examples, aspects of the operations of 2005 may be performed by a measurement indication manager 830 or a measurement indication manager 1230 as described with reference to FIGS. 8 and 12.

At 2010, the method may include transmitting a first downlink transmission to at least a first UE. The operations of 2010 may be performed in accordance with examples as disclosed herein. In some examples, aspects of the operations of 2010 may be performed by a broadcast communications manager 835 or a broadcast communications manager 1225 as described with reference to FIGS. 8 and 12.

At 2015, the method may include receiving a first uplink communication from the first UE, the first uplink communication providing a first channel quality indication of a measured channel quality of the first downlink transmission at the first UE. The operations of 2015 may be performed in accordance with examples as disclosed herein. In some examples, aspects of the operations of 2015 may be performed by a measurement indication manager 830 or a measurement indication manager 1230 as described with reference to FIGS. 8 and 12. In some cases, the first channel quality indication provides a RSRP associated with the first downlink transmission.

At 2020, the method may include determining the one or more transmission parameters for the downlink broadcast transmission based on one or more of a sequence that is included in the first uplink communication, a first uplink transmission resource of the uplink resources used for the first uplink communication, or a received power of the first uplink communication. The operations of 2020 may be performed in accordance with examples as disclosed herein. In some examples, aspects of the operations of 2020 may be performed by a measurement indication manager 830 or a measurement indication manager 1230 as described with reference to FIGS. 8 and 12.

At 2025, the method may include transmitting a downlink broadcast transmission to at least the first user equipment, where the downlink broadcast transmission has one or more transmission parameters that are based on the first channel quality indication. The operations of 2025 may be performed in accordance with examples as disclosed herein. In some examples, aspects of the operations of 2025 may be performed by a broadcast communications manager 835 or a broadcast communications manager 1225 as described with reference to FIGS. 8 and 12.

FIG. 21 shows a flowchart illustrating a method 2100 that supports techniques for link adaptation for broadcast channels in accordance with one or more aspects of the present disclosure. The operations of the method 2100 may be implemented by a UE or a network entity or its components as described herein. For example, the operations of the method 2100 may be performed by a UE 115 as described with reference to FIGS. 1 through 9 or a network entity as described with reference to FIGS. 1 through 5 and 10 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2105, the method may include transmitting a first downlink transmission to at least a first UE. The operations of 2105 may be performed in accordance with examples as disclosed herein. In some examples, aspects of the operations of 2105 may be performed by a broadcast communications manager 835 or a broadcast communications manager 1225 as described with reference to FIGS. 8 and 12.

At 2110, the method may include receiving a first uplink communication from the first UE, the first uplink communication providing a first channel quality indication of a measured channel quality of the first downlink transmission at the first UE. The operations of 2110 may be performed in accordance with examples as disclosed herein. In some examples, aspects of the operations of 2110 may be performed by a measurement indication manager 830 or a measurement indication manager 1230 as described with reference to FIGS. 8 and 12.

At 2115, the method may include determining one or more of a modulation and coding scheme, or a downlink transmit power for the downlink broadcast transmission, based on a first time of arrival of the first uplink communication relative to one or more other times of arrival of one or more other uplink communications from one or more other UEs. The operations of 2115 may be performed in accordance with examples as disclosed herein. In some examples, aspects of the operations of 2115 may be performed by an MCS manager 855 or an MCS manager 1235 as described with reference to FIGS. 8 and 12.

At 2120, the method may include transmitting a downlink broadcast transmission to at least the first user equipment, where the downlink broadcast transmission has one or more transmission parameters that are based on the first channel quality indication. The operations of 2120 may be performed in accordance with examples as disclosed herein. In some examples, aspects of the operations of 2120 may be performed by a broadcast communications manager 835 or a broadcast communications manager 1225 as described with reference to FIGS. 8 and 12.

The following provides an overview of aspects of the present disclosure:

Aspect 1: A method for wireless communication at a UE, comprising: receiving a first downlink transmission from a network entity; transmitting an uplink communication based at least in part on receiving the first downlink transmission, the uplink communication provides a channel quality indication that is based at least in part on a measured channel quality of the first downlink transmission; and receiving a downlink broadcast transmission, wherein the downlink broadcast transmission has one or more transmission parameters that are based at least in part on the channel quality indication.

Aspect 2: The method of aspect 1, wherein the receiving the downlink broadcast transmission comprises: decoding the downlink broadcast transmission based at least in part on a modulation and coding scheme that is selected based at least in part on the channel quality indication.

Aspect 3: The method of any of aspects 1 through 2, wherein the downlink broadcast transmission includes a RMSI shared channel transmission, a paging shared channel transmission, or a RACH response.

Aspect 4: The method of aspect 3, wherein the uplink communication includes a trigger for an on-demand SSB transmission or an on-demand RMSI transmission, or the uplink communication includes a PEI response.

Aspect 5: The method of any of aspects 1 through 4, wherein the transmitting the uplink communication comprises: setting an uplink transmit power for the uplink communication based at least in part on an open-loop power control technique; and transmitting the uplink communication using a transmission timing without an associated timing advance.

Aspect 6: The method of any of aspects 1 through 5, further comprising: measuring a reference signal received power (RSRP) associated with the first downlink transmission, and wherein the channel quality indication is based at least in part on the RSRP.

Aspect 7: The method of aspect 6, further comprising: selecting the channel quality indication from a set of available channel quality indications based at least in part on the RSRP and a set of RSRP threshold values that are mapped to the set of available channel quality indications.

Aspect 8: The method of aspect 7, further comprising: selecting, based at least in part on the channel quality indication, one or more of a sequence that is included in the uplink communication, a first uplink transmission resource of the uplink resources for transmission of the uplink communication, or a target receive power for the uplink communication.

Aspect 9: The method of any of aspects 1 through 8, wherein one or more measured channel quality thresholds and associated mappings to the channel quality indication are provided to the UE in a prespecified configuration, a SI communication, a SSB communication, a MIB communication, a control channel communication associated with the first downlink transmission, a communication from a serving cell for one or more neighboring cells, or any combinations thereof.

Aspect 10: The method of any of aspects 1 through 9, wherein the channel quality indication is provided in a payload of the uplink communication.

Aspect 11: The method of aspect 10, wherein the payload of the uplink communication includes one or more bits of a payload field, and different bit values associated with the payload field are mapped to different channel quality thresholds.

Aspect 12: The method of any of aspects 1 through 11, wherein the channel quality indication provides an interference indication that is based at least in part on a detected level of interference associated with the first downlink transmission, and the uplink communication indicates a transmission beam associated with the UE for the downlink broadcast transmission.

Aspect 13: The method of any of aspects 1 through 12, further comprising: selecting a RACH configuration based at least in part on the channel quality indication, the RACH configuration including one or more of a MSG1 or MSG3 format, a RACH preamble format, a number of repetitions for RACH messages, a MCS for RACH messages, or any combinations thereof.

Aspect 14: A method for wireless communication at a network entity, comprising: transmitting a first downlink transmission to at least a first UE; receiving a first uplink communication from the first UE, the first uplink communication providing a first channel quality indication of a measured channel quality of the first downlink transmission at the first UE; and transmitting a downlink broadcast transmission to at least the first user equipment, wherein the downlink broadcast transmission has one or more transmission parameters that are based at least in part on the first channel quality indication.

Aspect 15: The method of aspect 14, wherein the transmitting the downlink broadcast transmission comprises: encoding the downlink broadcast transmission based at least in part on a modulation and coding scheme that is selected based at least in part on the first channel quality indication.

Aspect 16: The method of any of aspects 14 through 15, wherein the downlink broadcast transmission includes a RMSI shared channel transmission, a paging shared channel transmission, or a RACH response.

Aspect 17: The method of aspect 16, wherein the first uplink communication includes a trigger for an on-demand SSB transmission or an on-demand RMSI transmission, or the first uplink communication includes a PEI response.

Aspect 18: The method of any of aspects 14 through 17, wherein an uplink transmit power for the first uplink communication is based at least in part on an open-loop power control technique, and the first uplink communication is transmitted using a transmission timing without an associated timing advance.

Aspect 19: The method of any of aspects 14 through 18, wherein the first channel quality indication provides a RSRP associated with the first downlink transmission.

Aspect 20: The method of aspect 19, further comprising: configuring the first UE with a set of available channel quality indications and an associated set of RSRP threshold values that are mapped to the set of available channel quality indications.

Aspect 21: The method of aspect 20, further comprising: determining the one or more transmission parameters for the downlink broadcast transmission based at least in part on one or more of a sequence that is included in the first uplink communication, a first uplink transmission resource of the uplink resources used for the first uplink communication, or a received power of the first uplink communication.

Aspect 22: The method of any of aspects 14 through 21, further comprising: determining one or more of a modulation and coding scheme, or a downlink transmit power for the downlink broadcast transmission, based at least in part on a first time of arrival of the first uplink communication relative to one or more other times of arrival of one or more other uplink communications from one or more other UEs.

Aspect 23: The method of any of aspects 14 through 22, wherein one or more measured channel quality thresholds and associated mappings to the first channel quality indication are provided to the UE in a prespecified configuration, a SI communication, a SSB communication, a MIB communication, a control channel communication associated with the first downlink transmission, a communication from a serving cell for one or more neighboring cells, or any combinations thereof.

Aspect 24: The method of any of aspects 14 through 23, wherein the first channel quality indication is provided in a payload of the first uplink communication.

Aspect 25: The method of aspect 24, wherein the payload of the first uplink communication includes one or more bits of a payload field, and different bit values associated with the payload field are mapped to different channel quality thresholds.

Aspect 26: The method of any of aspects 14 through 25, wherein the first channel quality indication also provides an interference indication that is based at least in part on a detected level of interference associated with the first downlink transmission.

Aspect 27: An apparatus for wireless communication at a UE, comprising a processor; memory coupled with the processor; and instructions stored in the memory and executable by the processor to cause the apparatus to perform a method of any of aspects 1 through 13.

Aspect 28: An apparatus for wireless communication at a UE, comprising at least one means for performing a method of any of aspects 1 through 13.

Aspect 29: A non-transitory computer-readable medium storing code for wireless communication at a UE, the code comprising instructions executable by a processor to perform a method of any of aspects 1 through 13.

Aspect 30: An apparatus for wireless communication at a network entity, comprising a processor; memory coupled with the processor; and instructions stored in the memory and executable by the processor to cause the apparatus to perform a method of any of aspects 14 through 26.

Aspect 31: An apparatus for wireless communication at a network entity, comprising at least one means for performing a method of any of aspects 14 through 26.

Aspect 32: A non-transitory computer-readable medium storing code for wireless communication at a network entity, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving a first downlink transmission from a network entity;

transmitting an uplink communication based at least in part on receiving the first downlink transmission, the uplink communication provides a channel quality indication that indicates a measured channel quality of the first downlink transmission from a set of available channel quality indications that indicate different values of the measured channel quality; and receiving a downlink broadcast transmission, wherein the downlink broadcast transmission includes information for multiple UEs and is received in accordance with one or more transmission parameters that are based at least in part on the channel quality indication.

2. The method of claim 1, wherein the receiving the downlink broadcast transmission comprises:

decoding the downlink broadcast transmission based at least in part on a modulation and coding scheme that is selected based at least in part on the channel quality indication.

3. The method of claim 1, wherein the downlink broadcast transmission includes a remaining minimum system information (RMSI) shared channel transmission, a paging shared channel transmission, or a random access channel (RACH) response.

4. The method of claim 3, wherein the uplink communication includes a trigger for an on-demand synchronization signal block (SSB) transmission or an on-demand RMSI transmission, or the uplink communication includes a paging early indication (PEI) response.

5. The method of claim 1, wherein the transmitting the uplink communication comprises:

setting an uplink transmit power for the uplink communication based at least in part on an open-loop power control technique; and transmitting the uplink communication using a transmission timing without an associated timing advance.

6. The method of claim 1, further comprising:

measuring a reference signal received power (RSRP) associated with the first downlink transmission, and wherein the channel quality indication is based at least in part on the RSRP.

7. The method of claim 6, further comprising:

selecting the channel quality indication from the set of available channel quality indications based at least in part on the RSRP and a set of RSRP threshold values that are mapped to the set of available channel quality indications.

8. The method of claim 7, further comprising:

selecting, based at least in part on the channel quality indication, one or more of a sequence that is included in the uplink communication, a first uplink transmission resource of a set of uplink resources for transmission of the uplink communication, or a target receive power for the uplink communication.

9. The method of claim 1, wherein one or more measured channel quality thresholds and associated mappings to the channel quality indication are provided to the UE in a prespecified configuration, a system information (SI) communication, a synchronization signal block (SSB) communication, a master information block (MIB) communication, a control channel communication associated with the first downlink transmission, a communication from a serving cell for one or more neighboring cells, or any combinations thereof.

10. The method of claim 1, wherein the channel quality indication is provided in a payload of the uplink communication.

11. The method of claim 10, wherein the payload of the uplink communication includes one or more bits of a payload field, and different bit values associated with the payload field are mapped to different channel quality thresholds.

12. The method of claim 1, wherein:

the channel quality indication provides an interference indication that is based at least in part on a detected level of interference associated with the first downlink transmission, and the uplink communication indicates a transmission beam associated with the UE for the downlink broadcast transmission.

13. The method of claim 1, further comprising:

selecting a random access channel (RACH) configuration based at least in part on the channel quality indication, the RACH configuration including one or more of a message-1 (MSG1) or message-3 (MSG3) format, a RACH preamble format, a number of repetitions for RACH messages, a modulation and coding scheme (MCS) for RACH messages, or any combinations thereof.

14. A method for wireless communication at a network entity, comprising:

transmitting a first downlink transmission to at least a first user equipment (UE);

receiving a first uplink communication from the first UE, the first uplink communication providing a first channel quality indication of a measured channel quality of the first downlink transmission at the first UE, wherein the first channel quality indication indicates a measured channel quality of the first downlink transmission from a set of available channel quality indications that indicate different values of the measured channel quality; and transmitting a downlink broadcast transmission to the first user equipment and one or more other UEs, wherein the downlink broadcast transmission has one or more transmission parameters that are based at least in part on the first channel quality indication.

15. The method of claim 14, wherein the transmitting the downlink broadcast transmission comprises:

encoding the downlink broadcast transmission based at least in part on a modulation and coding scheme that is selected based at least in part on the first channel quality indication.

16. The method of claim 14, wherein the downlink broadcast transmission includes a remaining minimum system information (RMSI) shared channel transmission, a paging shared channel transmission, or a random access channel (RACH) response.

17. The method of claim 16, wherein the first uplink communication includes a trigger for an on-demand synchronization signal block (SSB) transmission or an on-demand RMSI transmission, or the first uplink communication includes a paging early indication (PEI) response.

18. The method of claim 14, wherein an uplink transmit power for the first uplink communication is based at least in part on an open-loop power control technique, and the first uplink communication is transmitted using a transmission timing without an associated timing advance.

19. The method of claim 14, wherein the first channel quality indication provides a reference signal received power (RSRP) associated with the first downlink transmission.

20. The method of claim 19, further comprising:

configuring the first UE with the set of available channel quality indications and an associated set of RSRP threshold values that are mapped to the set of available channel quality indications.

21. The method of claim 20, further comprising:

determining the one or more transmission parameters for the downlink broadcast transmission based at least in part on one or more of a sequence that is included in the first uplink communication, a first uplink transmission resource of a set of uplink resources for the first uplink communication, or a received power of the first uplink communication.

22. The method of claim 14, further comprising:
determining one or more of a modulation and coding scheme, or a downlink transmit power for the downlink broadcast transmission, based at least in part on a first time of arrival of the first uplink communication relative to one or more other times of arrival of one or more other uplink communications from the one or more other UEs.

23. The method of claim 14, wherein one or more measured channel quality thresholds and associated mappings to the first channel quality indication are provided to the UE in a prespecified configuration, a system information (SI) communication, a synchronization signal block (SSB) communication, a master information block (MIB) communication, a control channel communication associated with the first downlink transmission, a communication from a serving cell for one or more neighboring cells, or any combinations thereof.

24. The method of claim 14, wherein the first channel quality indication is provided in a payload of the first uplink communication.

25. The method of claim 24, wherein the payload of the first uplink communication includes one or more bits of a payload field, and different bit values associated with the payload field are mapped to different channel quality thresholds.

26. The method of claim 14, wherein the first channel quality indication also provides an interference indication that is based at least in part on a detected level of interference associated with the first downlink transmission.

27. A user equipment (UE) for wireless communication, comprising:
at least one processor;
at least one memory coupled with the at least one processor; and
instructions stored in the at least one memory and executable by the at least one processor to cause the UE to:
receive a first downlink transmission from a network entity;
transmit an uplink communication based at least in part on receiving the first downlink transmission, the uplink communication provides a channel quality indication that indicates a measured channel quality of the first downlink transmission from a set of available channel quality indications that indicate different values of the measured channel quality; and
receive a downlink broadcast transmission, wherein the downlink broadcast transmission includes information for multiple UEs and is received in accordance with one or more transmission parameters that are based at least in part on the channel quality indication.

28. The UE of claim 27, wherein the instructions to receive the downlink broadcast transmission are executable by the at least one processor to cause the UE to:
decode the downlink broadcast transmission based at least in part on a modulation and coding scheme that is selected based at least in part on the channel quality indication.

29. A network entity for wireless communication, comprising:
at least one processor;
at least one memory coupled with the at least one processor; and
instructions stored in the at least one memory and executable by the at least one processor to cause the network entity to:
transmit a first downlink transmission to at least a first user equipment (UE);
receive a first uplink communication from the first UE, the first uplink communication providing a first channel quality indication of a measured channel quality of the first downlink transmission at the first UE, wherein the first channel quality indication indicates a measured channel quality of the first downlink transmission from a set of available channel quality indications that indicate different values of the measured channel quality; and
transmit a downlink broadcast transmission to the first user equipment and one or more other UEs, wherein the downlink broadcast transmission has one or more transmission parameters that are based at least in part on the first channel quality indication.

30. The network entity of claim 29, wherein the instructions to transmit the downlink broadcast transmission are executable by the at least one processor to cause the network entity to:
encode the downlink broadcast transmission based at least in part on a modulation and coding scheme that is selected based at least in part on the first channel quality indication.

* * * * *